US008627343B2

(12) United States Patent
Yamamichi

(10) Patent No.: US 8,627,343 B2
(45) Date of Patent: Jan. 7, 2014

(54) INFORMATION PROCESSING APPARATUS AND DATA OUTPUT MANAGING SYSTEM

(75) Inventor: Masaki Yamamichi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1202 days.

(21) Appl. No.: 12/160,565

(22) PCT Filed: Mar. 30, 2007

(86) PCT No.: PCT/JP2007/057713
§ 371 (c)(1),
(2), (4) Date: Jul. 10, 2008

(87) PCT Pub. No.: WO2007/114513
PCT Pub. Date: Oct. 11, 2007

(65) Prior Publication Data
US 2010/0235846 A1 Sep. 16, 2010

(30) Foreign Application Priority Data

Mar. 31, 2006 (JP) .................................. 2006-100194

(51) Int. Cl.
*G06F 13/00* (2006.01)
(52) U.S. Cl.
USPC ............................. 719/327; 717/168; 717/174
(58) Field of Classification Search
USPC .................... 719/327; 717/168, 174
See application file for complete search history.

(56) References Cited

U.S. PATENT DOCUMENTS

| 6,418,555 | B2 * | 7/2002 | Mohammed | 717/169 |
| 6,674,767 | B1 * | 1/2004 | Kadyk et al. | 370/466 |
| 2002/0161936 | A1 * | 10/2002 | Minagawa | 710/1 |
| 2003/0043396 | A1 * | 3/2003 | Klosterman et al. | 358/1.13 |
| 2003/0090704 | A1 * | 5/2003 | Hansen | 358/1.15 |
| 2003/0200289 | A1 * | 10/2003 | Kemp et al. | 709/221 |
| 2003/0217193 | A1 * | 11/2003 | Thurston et al. | 709/321 |
| 2004/0223182 | A1 * | 11/2004 | Minagawa | 358/1.15 |
| 2004/0263900 | A1 * | 12/2004 | Nguyen et al. | 358/1.15 |
| 2005/0162678 | A1 | 7/2005 | Nakata | 358/1.13 |

FOREIGN PATENT DOCUMENTS

| JP | 63-268031 | 11/1988 | G06F 9/06 |
| JP | 10-124435 | 5/1998 | G06F 13/10 |
| JP | 2005-050062 | 2/2005 | |
| JP | 2005-208895 | 8/2005 | G06F 13/10 |
| JP | 2006-085529 | 3/2006 | G06F 9/445 |

* cited by examiner

*Primary Examiner* — Andy Ho
(74) *Attorney, Agent, or Firm* — Fitzpatrick, Cella, Harper & Scinto

(57) ABSTRACT

A setup method of an information processing apparatus in which a module as a control program for expanding a printer driver has been installed. A plurality of modules are detected and the information processing apparatus is set up so that the plurality of detected modules execute processes in predetermined operating order.

17 Claims, 18 Drawing Sheets

FIG. 22

STORING MEDIUM SUCH AS FD/CD-ROM, ETC.

| DIRECTORY INFORMATION |
| --- |
| 1ST DATA PROCESSING PROGRAM<br>PROGRAM CODE GROUP CORRESPONDING TO<br>STEPS IN FLOWCHART SHOWN IN FIG. 4 |
| 2ND DATA PROCESSING PROGRAM<br>PROGRAM CODE GROUP CORRESPONDING TO<br>STEPS IN FLOWCHART SHOWN IN FIG. 5 |
| 3RD DATA PROCESSING PROGRAM<br>PROGRAM CODE GROUP CORRESPONDING TO<br>STEPS IN FLOWCHART SHOWN IN FIG. 6 |
| 4TH DATA PROCESSING PROGRAM<br>PROGRAM CODE GROUP CORRESPONDING TO<br>STEPS IN FLOWCHART SHOWN IN FIG. 7 |
| 5TH DATA PROCESSING PROGRAM<br>PROGRAM CODE GROUP CORRESPONDING TO<br>STEPS IN FLOWCHART SHOWN IN FIG. 8 |
| 6TH DATA PROCESSING PROGRAM<br>PROGRAM CODE GROUP CORRESPONDING TO<br>STEPS IN FLOWCHART SHOWN IN FIG. 14 |
| 7TH DATA PROCESSING PROGRAM<br>PROGRAM CODE GROUP CORRESPONDING TO<br>STEPS IN FLOWCHART SHOWN IN FIG. 17 |
| 8TH DATA PROCESSING PROGRAM<br>PROGRAM CODE GROUP CORRESPONDING TO<br>STEPS IN FLOWCHART SHOWN IN FIG. 18 |
| 9TH DATA PROCESSING PROGRAM<br>PROGRAM CODE GROUP CORRESPONDING TO<br>STEPS IN FLOWCHART SHOWN IN FIG. 19 |
| 10TH DATA PROCESSING PROGRAM<br>PROGRAM CODE GROUP CORRESPONDING TO<br>STEPS IN FLOWCHART SHOWN IN FIG. 20 |
| 11TH DATA PROCESSING PROGRAM<br>PROGRAM CODE GROUP CORRESPONDING TO<br>STEPS IN FLOWCHART SHOWN IN FIG. 21 |

MEMORY MAP IN STORING MEDIUM

INFORMATION PROCESSING APPARATUS AND DATA OUTPUT MANAGING SYSTEM

TECHNICAL FIELD

The present invention relates to a method of providing an expanding function of a printer driver by mainly adding a function expanding module to the printer driver.

BACKGROUND ART

In recent years, in order to raise an additional value of a print result, there is such a tendency that advanced novel additional functions such as copy guarding function, form overlay, digital watermark, job tracing function, and the like are added to the printer driver. In many cases, those additional functions have additional values more than normal printing, it is presumed that they are provided as onerous options without packaged together with a basic printer driver set.

In order to suppress dependency on versions of a plurality of printer drivers and a model of a printing apparatus as much as possible, those functions are provided as additional add-in (plug-in) modules having a common expanding interface.

There is such an advantage that if a system corresponds to the common expanding interface, even in a combination with a basic printer driver set which was released in the past, merely by providing the add-in module, the novel additional function can be realized. In other words, by providing the novel function by the add-in, the function which is not presumed at the beginning of the sale of the printing apparatus and cannot be recognized by the printing apparatus can be also additionally added to the printer driver later.

In Japanese Patent Application Laid-Open No. 2005-208895, there has been disclosed a detailed method of adding and deleting function expanding modules such as program file, data file, and the like to a printer driver corresponding to the common expanding interface as mentioned above.

In Japanese Patent Application Laid-Open No. H10-124435, there has been disclosed the following technique. A file searching program 7 searches for a printer driver registered in a registry file 12. A check program 6 confirms whether or not a printer driver of the same line-up as that of a driver of a second printer 11 has already been registered in the registry file 12. The check program discriminates the presence or absence of competition between resources of the driver of the second printer 11 to be newly registered and resources of a driver of a first printer which has already been registered. That is, if an I/O port address which is allocated to the second printer 11 and that allocated to the first printer compete, the processing routine advances to step 106. If they do not compete, step 105 follows. The driver of the second printer 11 is registered into the registry file 12 by a file writing program 5 and the printer driver is written into an auxiliary storing device such as a hard disk or the like of a computer, thereby executing installation. If the I/O port address compete, in step 106, in order to notify the user that the installing order is incorrect, a predetermined warning is displayed onto a monitor 13 by an alarm displaying program 9. The driver is deleted and the installing order is changed.

However, in the conventional techniques, when the module is added, nothing is considered with respect to operating order of the modules which have already been installed. Therefore, there is such a problem that when the function expanding module is optionally added to the modules constructing the existing printer driver, there is a case where the function expanding module does not operate or does not operate normally.

Further, according to Japanese Patent Application Laid-Open No. H10-124435, in the case where the driver is installed once and a setting of a port competes, the installing order is exchanged.

The above problem is not limited to the printer driver but can occur in the whole program to which modules can be added.

DISCLOSURE OF THE INVENTION

There is disclosed a setup method of an information processing apparatus in which a module as a control program for expanding a printer driver has been installed, comprising: detecting a plurality of the modules as control programs each for expanding the printer driver; and setting up the information processing apparatus so that the plurality of detected modules execute processes in predetermined operating order.

Further features of the present invention will become apparent from the following description of exemplary embodiments with reference to the attached drawings.

BRIEF DESCRIPTION OF THE DRAWINGS

FIG. 22 is a diagram for describing a memory map in a storing medium (recording medium) for storing various data processing programs which can be read by the information processing apparatus (computer) according to the invention.

BEST MODE FOR CARRYING OUT THE INVENTION

One aspect of the embodiment is made to solve the foregoing problems. It is an object of the invention to provide a feature in which when a module is added to a program such as a printer driver or the like, operating order of the module to be added and existing modules constructing the program is correctly controlled, thereby enabling the modules constructing the program to operate properly upon execution of a printing process.

As another object of the invention, there is another aspect to provide a feature in which a proper installing procedure is previously determined according to the operating order and installed.

First Embodiment

An exemplary embodiment to which the invention is applied will be described hereinbelow.

Figure 1:
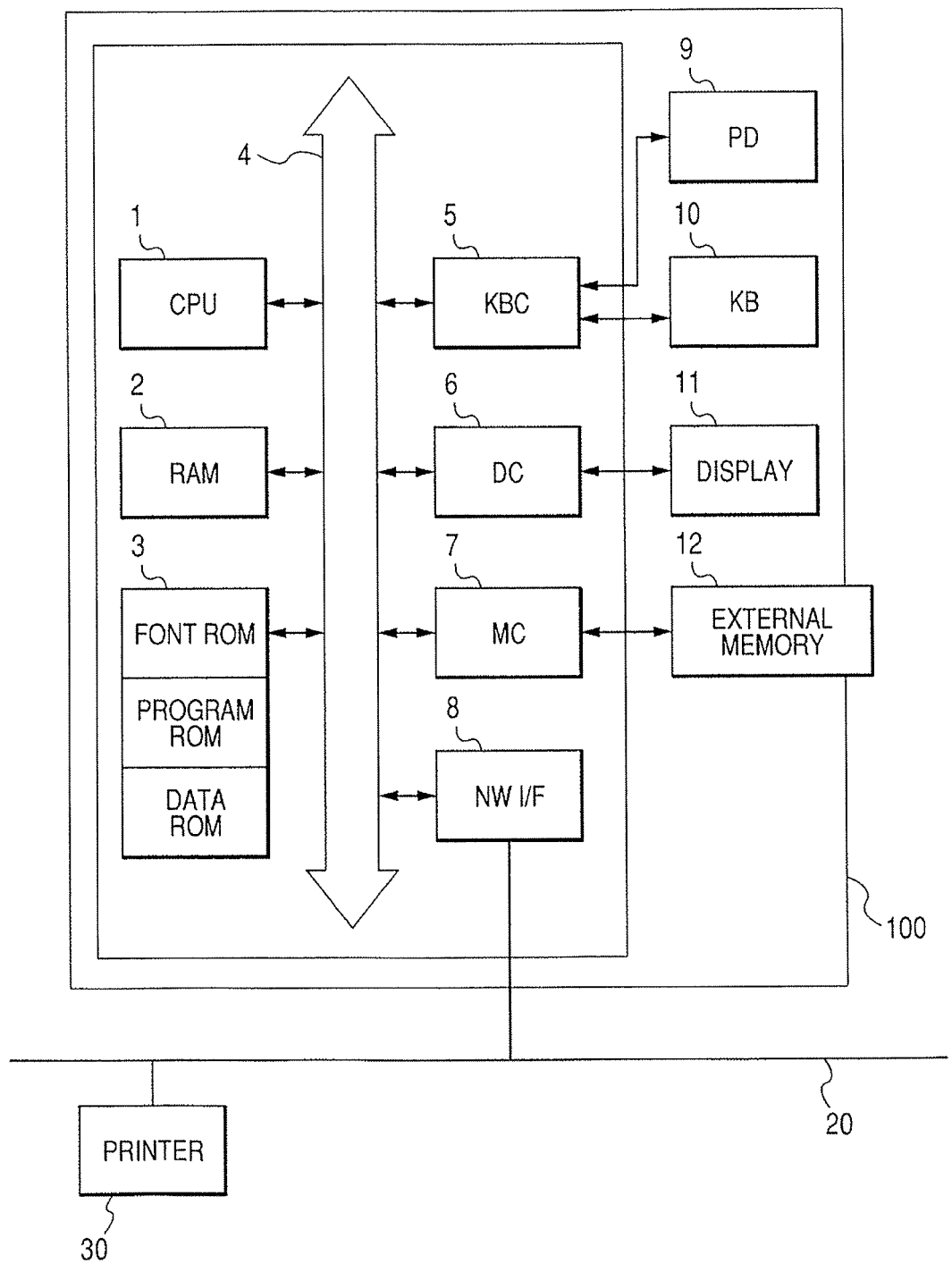
FIG. 1 is a block diagram illustrating an example of an information processing apparatus to which the invention can be applied.

FIG. 1 is a block diagram illustrating an example of an information processing apparatus to which the invention can be applied.

In FIG. 1, a computer as an information processing apparatus (for example, personal computer) 100 is provided. In a print system of the invention, the computer 100 and a printer 30 are connected by one of an interface such as Centronics and a network such as Ethernet (registered trademark). Although a case where the computer 100 and the printer 30 are connected by a network 20 has been illustrated in FIG. 1, it is also possible to use a construction in which they are connected via an interface (not shown) (for example, USB, Centronics, or the like).

A CPU 1 controls each device connected to a system bus 4 on the basis of a program (BIOS, OS, application program, various installers including an add-in installer, which will be described hereinafter, or the like) stored in one of a program ROM in a ROM 3 and an external memory 12 and integratedly controls the whole apparatus.

Font data and the like are stored into a font ROM in the ROM 3. Various kinds of data is stored into a data ROM in the ROM 3. A RAM 2 functions as a main memory, a work area, or the like of the CPU 1.

A keyboard controller (KBC) 5 controls an input from a pointing device 9 (for example, mouse), a keyboard (KB) 10, or the like. A display controller (DC) 6 controls a display of a display 11. The display 11 may be a CRT, an LCD, or a display apparatus of another type.

A memory controller (MC) 7 controls an access to the external memory 12 (hard disk (HD), a flexible disk (FD) (not shown), a CD-ROM, or the like). A network interface (NW I/F) 8 controls communication with the printer 30 through the network 20.

<Construction of System>

A printer driver, an add-in module, and another construction necessary to realize the invention will be described hereinbelow with respect to the computer 100 illustrated in FIG. 1 as an example.

Figure 2:
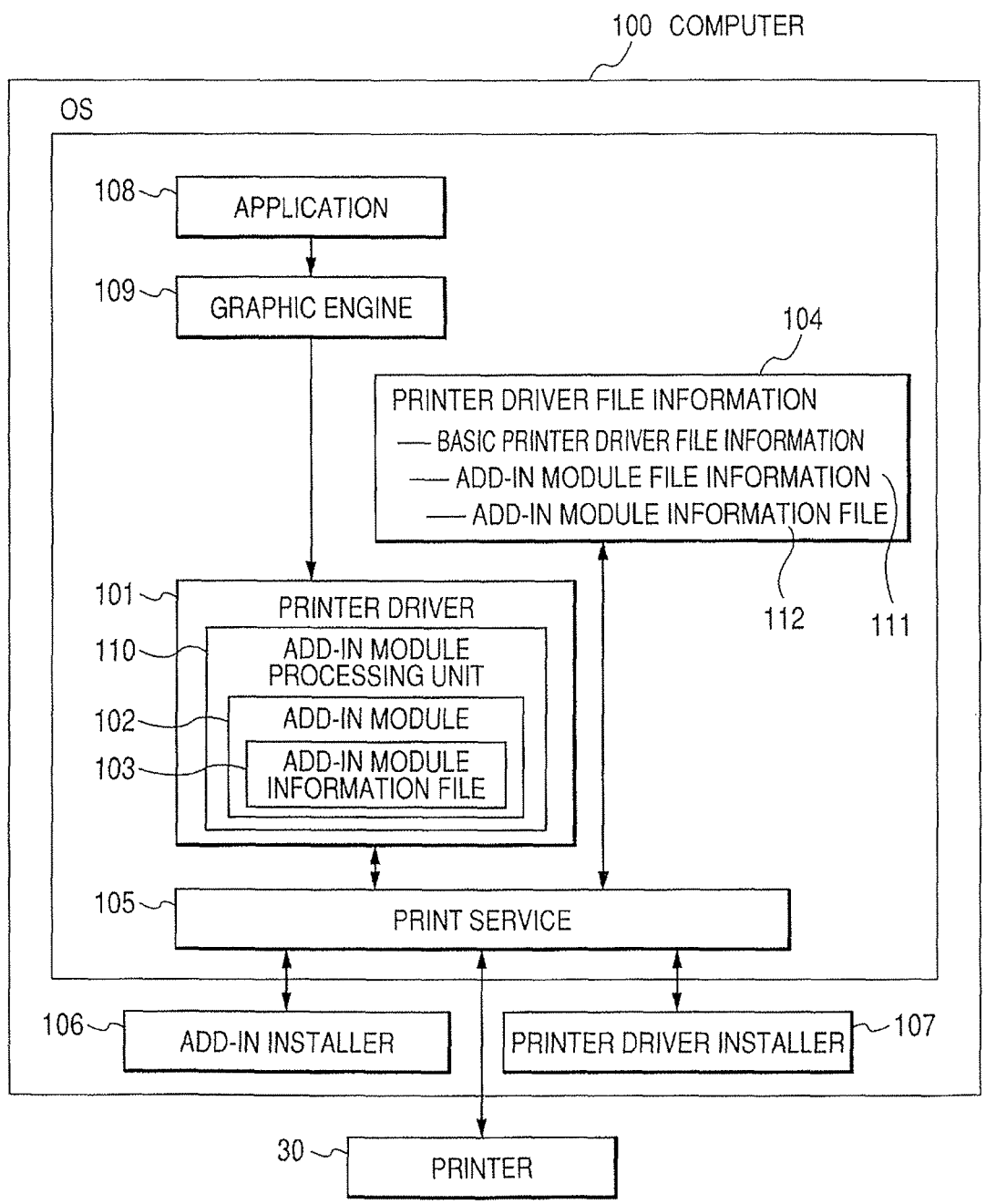
FIG. 2 is a block diagram illustrating a constructional example of a print system according to the first embodiment of the invention.

FIG. 2 is a block diagram illustrating a constructional example of the print system according to the first embodiment of the invention. The same component elements as those in FIG. 1 are designated by the same reference numerals.

In FIG. 2, a printer driver 101 is a program for allowing the computer 100 to instruct the printer 30 to print. The printer driver 101 inputs a print command from an application 108 or the like of the computer 100 through a graphic engine 109 in the OS. The printer driver 101 converts the input print command into a control command which can be recognized by the printer 30 and transfers to the printer through a print service 105.

The printer driver 101 is installed by a printer driver installer 107 or a printer driver installing method (not shown) which is provided by the OS and can be used.

An add-in module 102 is a file group including a program file such as DLL (Dynamic Link Library) and the like. The add-in module 102 is installed by one of an add-in installer 106 and the printer driver 101, so that it can communicate by using a common interface of the printer driver, thereby realizing a function expansion. That is, the add-in installer 106 is a program which can be executed in the state where the printer driver 101 has been installed. The add-in module 102 operates as a part of the printer driver.

An add-in module information file 103 will now be described.

Figure 3:
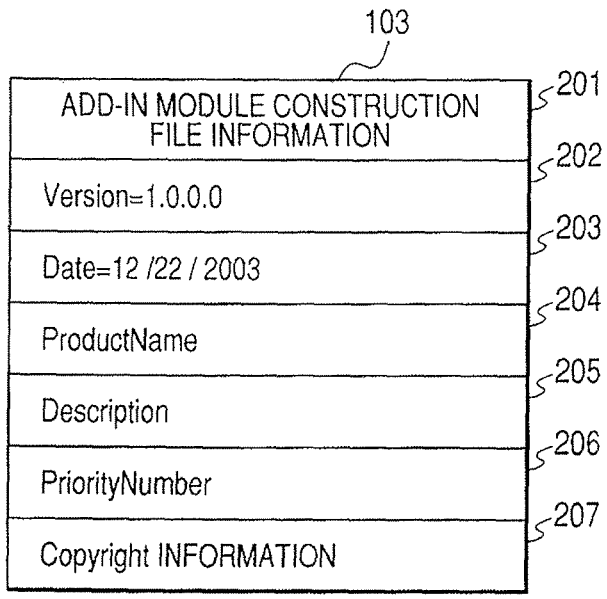
FIG. 3 is a data constructional diagram showing a data construction of an add-in module information file illustrated in FIG. 2.

The add-in module information file 103 is one of the group of files constructing the add-in module and has information as illustrated in an example in FIG. 3. A file format of the add-in module information file 103 may be one of readable text format and XML format or a non-readable format such as a binary file. A data construction of the add-in module information file 103 will now be described with reference to FIG. 3.

FIG. 3 is a data constructional diagram showing the data construction of the add-in module information file 103 illustrated in FIG. 2.

In FIG. 3, add-in module construction file information 201 is an area where a file construction of the add-in module 102 has been described. Version information of the add-in module 102 has been described in an area 202. A date of release of the add-in module 102 has been described in an area 203. Product name information of the add-in module 102 has been described in an area 204. Detailed information of the add-in module 102 has been described in an area 205.

A priority number (PriorityNumber) 206 is an area where an unconditional number which decides order of the operation has been described. An area 207 is an area where Copyright information of the add-in module 102 has been described.

Description will be made hereinbelow by returning to FIG. 2.

Printer driver file information 104 is one management information (construction information) for allowing the OS to use the printer driver by using the print service 105. The printer driver file information 104 has been registered in a predetermined area (predetermined storing area which is managed by the OS) in the external memory 12. For example, in Windows (registered trademark), "DependentFiles" in a registry corresponds to the printer driver file information 104. If a plurality of printer drivers have been installed, the printer driver file information 104 is registered into the external memory 12 every printer driver.

In FIG. 2, the add-in module 102 has been installed and add-in module file information 111 has been registered in the printer driver file information 104. Information (for example, add-in module information file name) 112 to specify the add-in module information file is included in the add-in module file information 111.

Although not shown, even if an add-in module different from the add-in module 102 has separately been installed, the printer driver 101 can operate. If a plurality of add-in modules have been installed in the printer driver 101, the add-in module file information 111 (including the information 112 to specify the add-in module information file) is registered every add-in module.

The print service 105 is a service program to control one of the printing and the installation of the printer driver 101 on the operating system (OS).

The add-in installer 106 is a center device to accomplish the object of the invention and is a program for additionally installing the add-in module into the installed printer driver 101. It is now assumed that the add-in module file to be additionally installed has been stored in one of the add-in installer 106 and another storing area in the external memory 12.

The add-in installer 106 mainly has the following functions (1) to (5).

Construction module detecting function for detecting one or a plurality of modules constructing one or a plurality of printer drivers.

Module proper operating order discriminating function for discriminating the order of the proper operations of the add-in module to be added and one or a plurality of modules (installed add-in module 102) constructing the printer driver 101 (order adapted to make the plurality of add-in modules operative).

File adding function for adding the add-in module file.

File registering function for registering the added additional file into the printer driver file information 104 according to the operating order determined by the foregoing module proper operating order discriminating function.

Recognizing function for allowing the print service 105 to recognize the change in module construction.

A flow for processes in the add-in installer 106 will be described in detail with reference to FIG. 4 and subsequent drawings, which will be described hereinafter.

The printer driver installer 107 is a program for installing the printer driver 101 into the computer 100.

The add-in installer 106 and the printer driver installer 107 are realized by a method whereby the programs stored in the external memory 12 is executed in the RAM 2 by the CPU 1 illustrated in FIG. 1.

<Flow for the Processes in the Add-in Installer 106>

Figure 4:
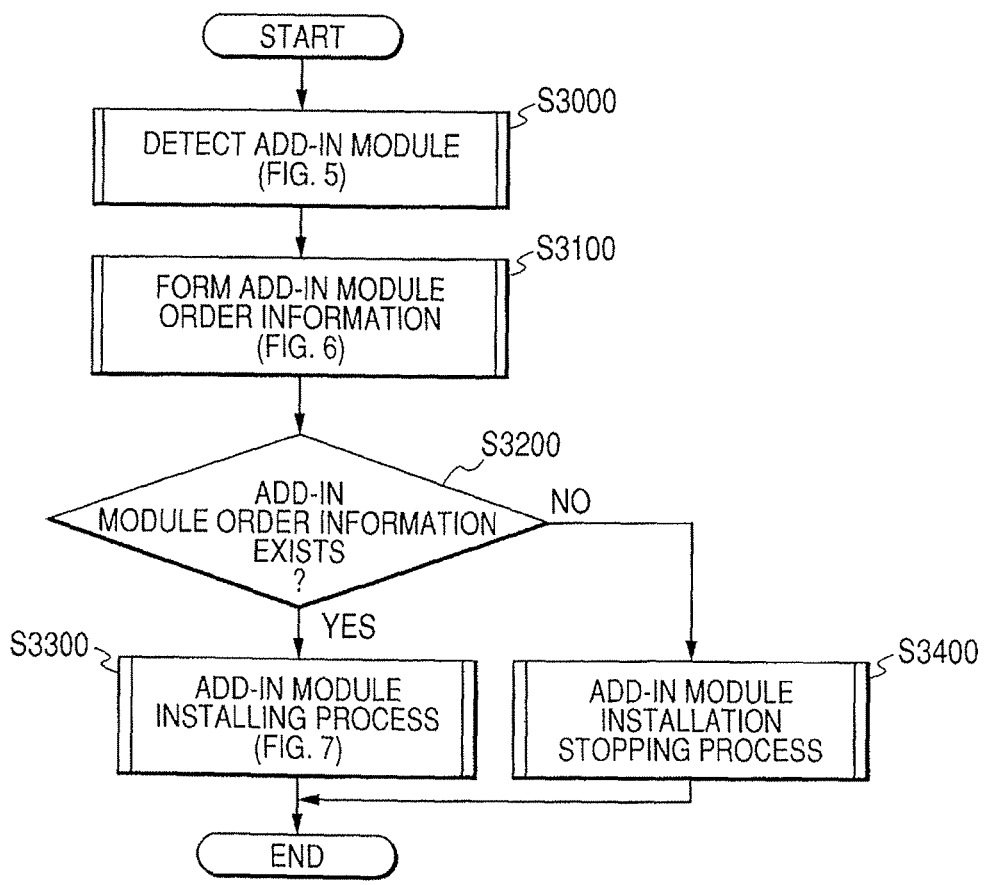
FIG. 4 is a flowchart showing an example of a first control processing procedure in the invention.

FIG. 4 is a flowchart showing an example of a first control processing procedure in the invention and corresponds to the detailed flow for the processes in the add-in installer 106. That is, the processes in this flowchart are realized by a method whereby the program which corresponds to the add-in installer 106 and has been stored in the external memory 12 is executed in the RAM 2 by the CPU 1. In the flowchart, S3000 to S3400 indicate processing steps.

First, in step S3000, the add-in installer 106 detects the installed add-in module with respect to the addition target printer driver of the add-in module. The addition target printer driver of the add-in module is a printer driver which has been installed in the computer 100. The printer driver selected as an addition target of the add-in module by the user corresponds to such an addition target printer driver. It is assumed here that the printer driver 101 in FIG. 2 is the addition target printer driver. Details of the process of step S3000 will be described in FIG. 5.

Subsequently, in step S3100, the add-in installer 106 forms add-in module order information. According to this process, in a printing process by both of the installed add-in module 102 detected in step S3000 and the add-in module to be added by the add-in installer 106, add-in module order information which holds proper order information (order adapted to make the plurality of add-in modules operative) is formed. The add-in module order information is formed only when the order in which the add-in modules can operate properly (order adapted to make the plurality of add-in modules operative) exists.

As a holding format of the add-in module order information, although a format such as file format or format in which such information is held in the RAM 2 is not limited, description will be made here on the assumption that such information is held in the RAM 2. In the add-in module order information, the number showing the order and a module name are held as a minimum information construction. Details of the process of step S3100 will be described in FIG. 6.

Subsequently, in step S3200, the add-in installer 106 discriminates whether or not the add-in module order information exists in the RAM 2. If it is determined that the add-in module order information does not exist in the RAM 2, the add-in installer 106 advances a processing routine to step S3400.

The add-in installer 106 stops the add-in module installing process in step S3400 and finishes the processing routine of this flowchart.

If it is determined in step S3200 that the add-in module order information exists in the RAM 2, the add-in installer 106 advances the processing routine to step S3300.

The add-in installer 106 executes the add-in module installing process in step S3300 and finishes the processing routine of this flowchart. Details of the process in step S3300 will be described in FIG. 7.

Figure 5:
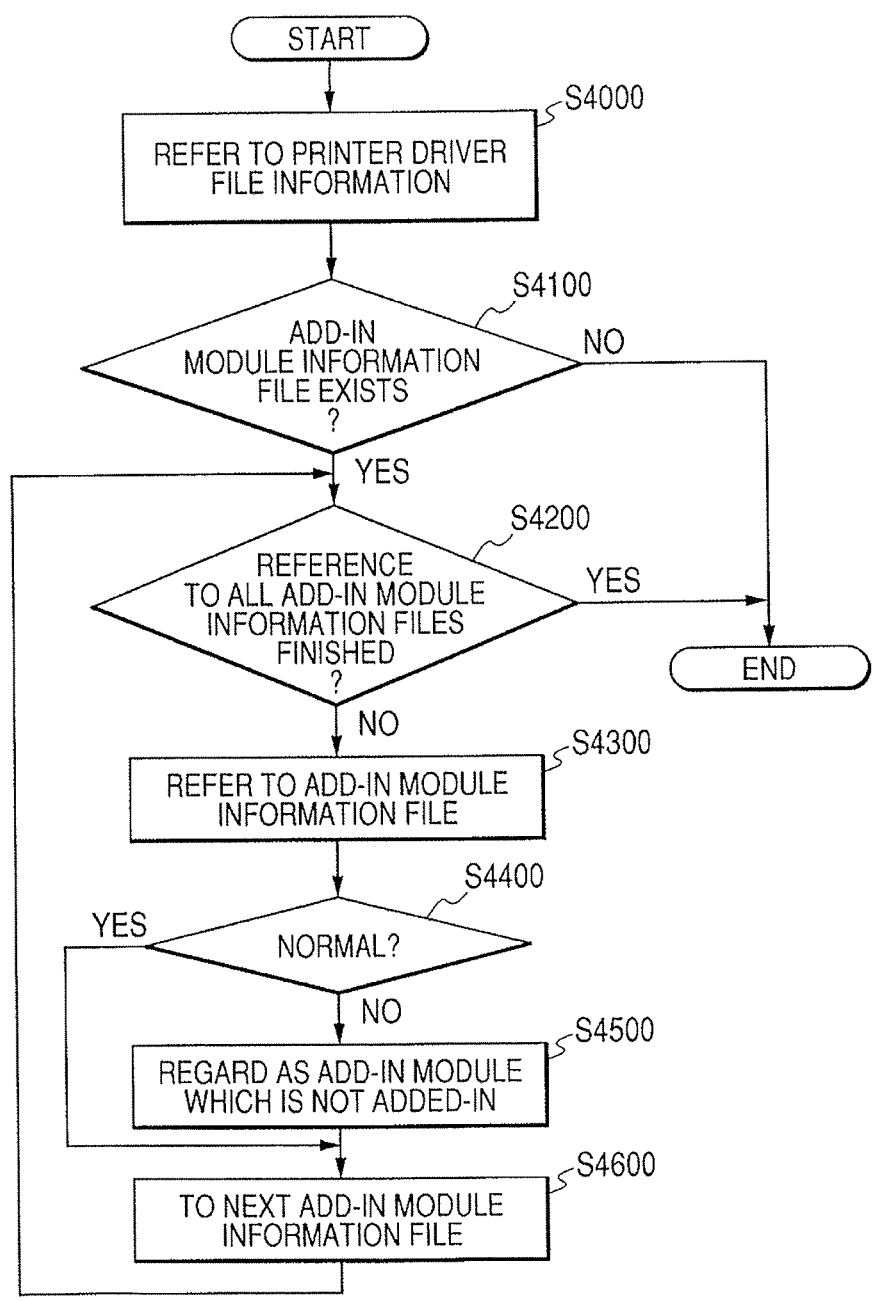
FIG. 5 is a flowchart showing an example of a second control processing procedure in the invention.

FIG. 5 is a flowchart showing an example of a second control processing procedure in the invention and corresponds to the detailed flow for the add-in module detecting process shown in step S3000 in FIG. 4. That is, the processes in this flowchart are realized by a method whereby the program which corresponds to the add-in installer 106 and has been stored in the external memory 12 is executed in the RAM 2 by the CPU 1. In the flowchart, S4000 to S4600 indicate processing steps.

First, in step S4000, the add-in installer 106 obtains the construction information regarding the printer driver 101 with reference to the printer driver file information 104.

Subsequently, in step S4100, the add-in installer 106 discriminates whether or not the add-in module information file 103 exists. In this discriminating step, when at least one file information (add-in module file information 111) regarding the add-in module information file 103 is included in the construction information obtained in step S4000, it is determined that the add-in module information file 103 exists. If none of the add-in module file information 111 is included in the construction information, it is determined that the add-in module information file 103 does not exist.

If it is determined in step S4100 that the add-in module information file 103 does not exist, the add-in installer 106 finishes the processing routine of this flowchart as it is and advances the processing routine to step S3100 in FIG. 4.

If it is determined in step S4100 that the add-in module information file 103 exists, the add-in installer 106 advances the processing routine to step S4200.

In step S4200, the add-in installer 106 discriminates whether or not the reference to all of the add-in module information files 103 registered in the construction information obtained in step S4000 has been finished.

If it is determined in step S4200 that the reference to all of the add-in module information files 103 is not finished yet, the add-in installer 106 advances the processing routine to step S4300.

In step S4300, the add-in installer 106 selects one of the add-in module information files 103 which have been registered in the construction information obtained in step S4000 and are not referred to yet, and refers to the information in the selected add-in module information file 103.

In next step S4400, the add-in installer 106 discriminates whether or not the information in the add-in module information file 103 has normally been referred to in step S4300.

If it is determined in step S4400 that the information in the add-in module information file 103 is not normally referred to in step S4300, the add-in installer 106 advances the processing routine to step S4500.

In step S4500, the add-in installer 106 regards that this add-in module is not normally operating, that is, the add-in of this add-in module is not performed, and advances the processing routine to step S4600.

If it is determined in step S4400 that the information in the add-in module information file 103 has normally been referred to in step S4300, the add-in installer 106 advances the processing routine to step S4600.

In step S4600, the add-in installer 106 advances the processing routine to the reference to the next add-in module information file 103 and returns the processing routine to step S4200.

If it is determined in step S4200 that the reference to all of the add-in module information files 103 registered in the construction information has been finished, the add-in installer 106 finishes the processing routine of this flowchart and advances the processing routine to step S3100 in FIG. 4.

In this manner, the detailed operation of the add-in module detecting process shown in step S3000 in FIG. 4 is executed. If a plurality of printer drivers to which the add-in module is added are selected, processes similar to those mentioned above are repeated the number of times corresponding to the number of printer drivers which are selected.

Figure 6:
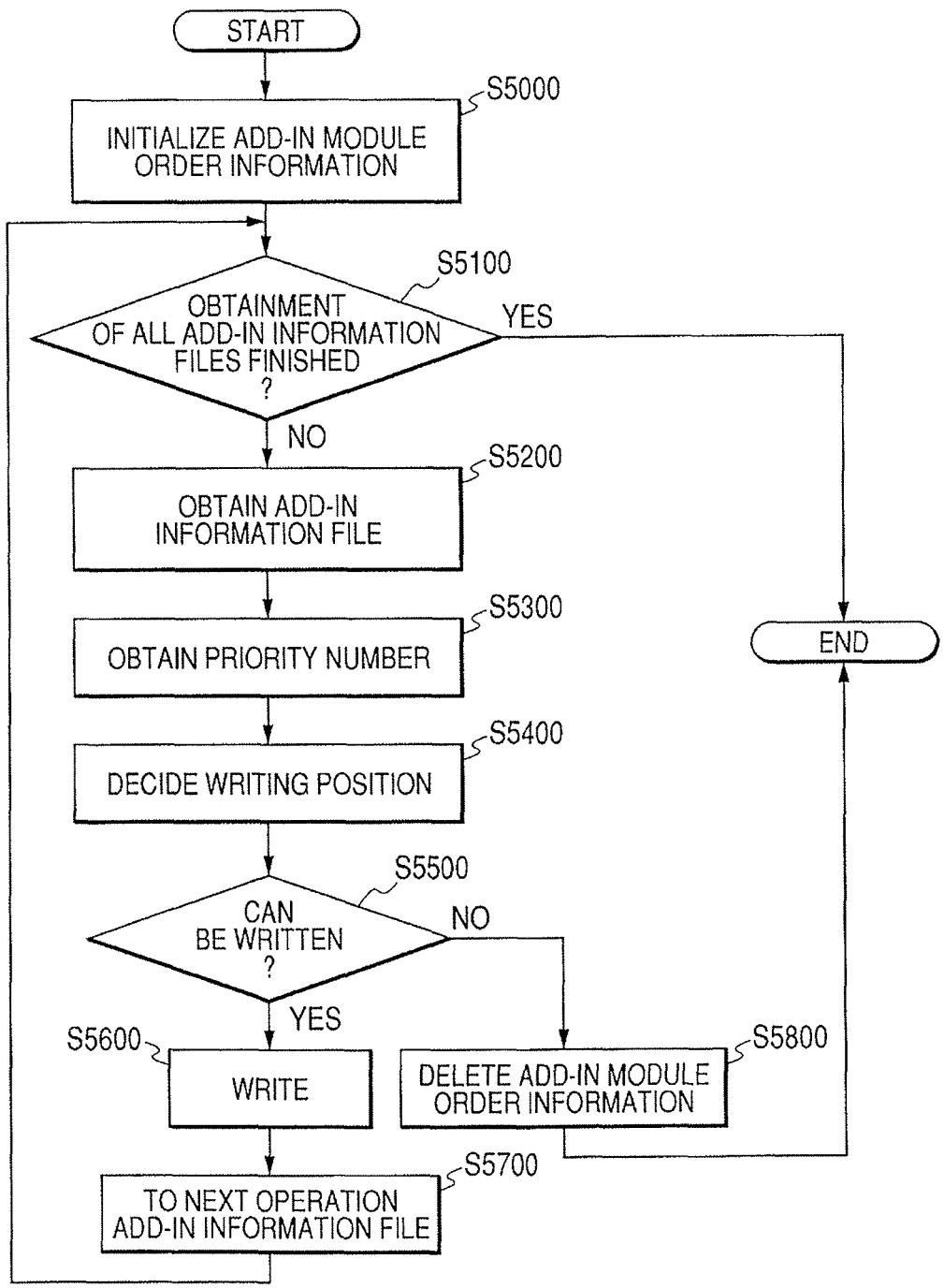
FIG. 6 is a flowchart showing an example of a third control processing procedure in the invention.

FIG. 6 is a flowchart showing an example of a third control processing procedure in the invention and corresponds to the detailed flow for the add-in module order information forming process shown in step S3100 in FIG. 4. That is, the processes in this flowchart are realized by a method whereby the program which corresponds to the add-in installer 106 and has been stored in the external memory 12 is executed in the RAM 2 by the CPU 1. In the flowchart, S5000 to S5800 indicate processing steps.

First, in step S5000, the add-in installer 106 executes an initializing process such as a process to newly form add-in module order information and the like.

In step S5100, the add-in installer 106 discriminates whether or not the obtainment of the add-in module information files of all of the add-in modules detected in step S3000 in FIG. 4 and all of the add-in modules to be added from now on has been finished with respect to the addition target printer drivers of the add-in modules. That is, the add-in installer 106 discriminates whether or not the forming process of the add-in module order information has been completed.

If it is determined in step S5100 that the obtainment of the add-in module information files of all of the add-in modules detected in step S3000 in FIG. 4 and all of the add-in modules to be added from now on is not finished yet, the add-in installer 106 advances the processing routine to step S5200.

In step S5200, the add-in installer 106 obtains one of the add-in module information files 103 which are not obtained yet among the add-in modules detected in step S3000 in FIG. 4 and the add-in modules to be added from now on. The add-in module corresponding to the obtained add-in module information file 103 is called an "add-in module which is highlighted at present".

In step S5300, the add-in installer 106 obtains the PriorityNumber 206 from the add-in module information file 103 obtained in step S5200. The PriorityNumber denotes, for example, an integer of 1 or more and defines the operating order according to a magnitude of a numerical value. By this PriorityNumber, it is also possible to cope with the case where the module has newly been added.

In step S5400, the add-in installer 106 compares the PriorityNumbers of the add-in modules which have already been written in the add-in module order information until this processing step with the PriorityNumber of the add-in module which is highlighted at present. The add-in installer 106 determines the order (writing positions into the add-in module order information) so as to become the ascending order of the PriorityNumbers.

Subsequently, in step S5500, the add-in installer 106 discriminates whether or not the PriorityNumbers can be written to the writing positions determined in step S5400. As a case where the PriorityNumbers cannot be written, a case where the PriorityNumbers are the same or such a competition that the modules cannot coexist or the like has occurred is considered.

If it is determined in step S5500 that the writing is impossible, the add-in installer 106 advances the processing routine to step S5800.

In step S5800, the add-in installer 106 determines that the proper order (operating order adapted to make operative the add-in modules which have previously been added and the add-in modules which are added from now on) does not exist, and deletes the add-in module order information held in the RAM 2 at present. The add-in installer 106 displays a message to the display 11 in a step (not shown) in order to notify the user that the proper order (order adapted to make the add-in modules operative) to which the modules are applied does not exist because the PriorityNumbers are the same or such a competition that the modules cannot coexist or the like has occurred. The add-in installer 106 finishes the processing routine of this flowchart and advances the processing routine to step S3200 in FIG. 4.

If it is determined in step S5500 that the writing is possible, the add-in installer 106 advances the processing routine to step S5600.

In step S5600, the add-in installer 106 writes the name of the add-in module which is highlighted at present to the writing position in the add-in module order information decided in step S5400. In the embodiment, the number showing the order and the add-in module name are written.

Subsequently, in step S5700, the add-in installer 106 advances the processing routine to the next add-in module information file and returns the processing routine to step S5100.

If it is determined in step S5100 that the obtainment of the add-in module information files of all of the add-in modules detected in step S3000 in FIG. 4 and all of the add-in modules to be added from now on has been finished, the add-in installer 106 finishes the processes in this flowchart and advances the processing routine to step S3200 in FIG. 4.

In this manner, the detailed operation of the add-in module order information forming process shown in step S3100 in FIG. 4 is executed. If a plurality of printer drivers to which the add-in module is added are selected, processes similar to those mentioned above are repeated the number of times corresponding to the number of printer drivers which are selected.

Although each add-in module holds the PriorityNumber and the add-in module order information is formed in FIG. 6, the add-in module order information can be provided as file information from the outside. For example, it is also possible to construct the system in such a manner that the add-in module order information is opened as file information on the Web and it is obtained and provided from the Web.

The add-in module order information may have a text format such as XML or a non-readable binary format and its data format is not limited.

Figure 7:
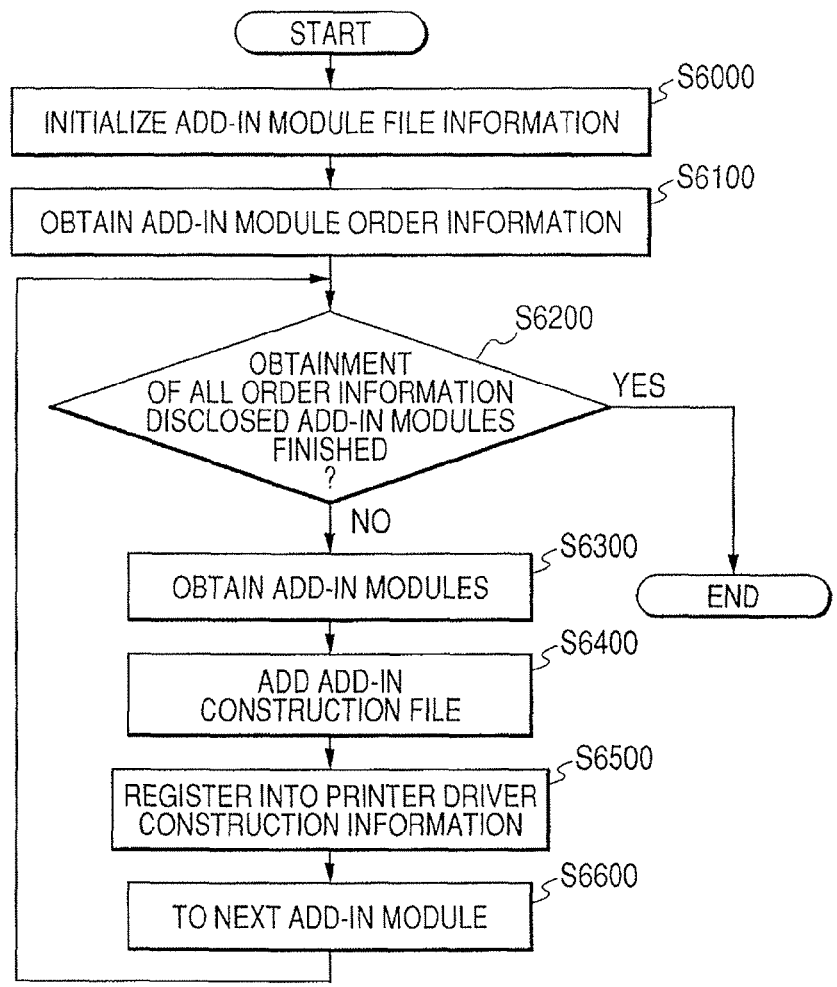
FIG. 7 is a flowchart showing an example of a fourth control processing procedure in the invention.

FIG. 7 is a flowchart showing an example of a fourth control processing procedure in the invention and corresponds to the detailed flow for the add-in module installing process shown in step S3300 in FIG. 4. That is, the processes in this flowchart are realized by a method whereby the program which corresponds to the add-in installer 106 and has been stored in the external memory 12 is executed in the RAM 2 by the CPU 1. In the flowchart, S6000 to S6600 indicate processing steps.

First, in step S6000, the add-in installer 106 initializes the add-in module file information 111 registered in the printer driver file information 104.

Subsequently, in step S6100, the add-in installer 106 obtains the add-in module order information formed in step S3100.

In next step S6200, the add-in installer 106 discriminates whether or not the installing process of all of the add-in modules written in the add-in module order information obtained in step S6100 has been completed.

If it is determined in step S6200 that the installing process of all of the add-in modules written in the add-in module order information obtained in step S6100 is not completed, the add-in installer 106 advances a processing routine to step S6300.

In step S6300, the add-in installer 106 obtains one add-in module (add-in module construction file) from the smaller operating order according to the add-in module order information.

Subsequently, in step S6400, the add-in installer 106 adds the add-in module construction file obtained in step S6300 to a predetermined area in the external memory 12 (storing area in the OS). It is assumed that this processing step is executed only to the add-in module which is newly additionally installed this time and it is skipped with respect to the add-in modules which have previously been added.

In next step S6500, the add-in installer 106 registers the add-in module file information 111 (including the information 112 to specify the add-in module information file) into the printer driver construction information (printer driver file information 104).

In next step S6600, the add-in installer 106 advances the processing routine to the next add-in module written in the add-in module order information and returns the processing routine to step S6200.

If it is determined in step S6200 that the installing process of all of the add-in modules written in the add-in module order information has been completed, the add-in installer 106 finishes the processes of this flowchart.

By executing the installing process as mentioned above, the new add-in module can be registered in such a manner that the add-in modules which have previously been added and the add-in modules which were newly added can execute the processes in the operating order decided in step S3100 in FIG. 4.

<With Respect to Add-in Installer UI>

Figure 8:
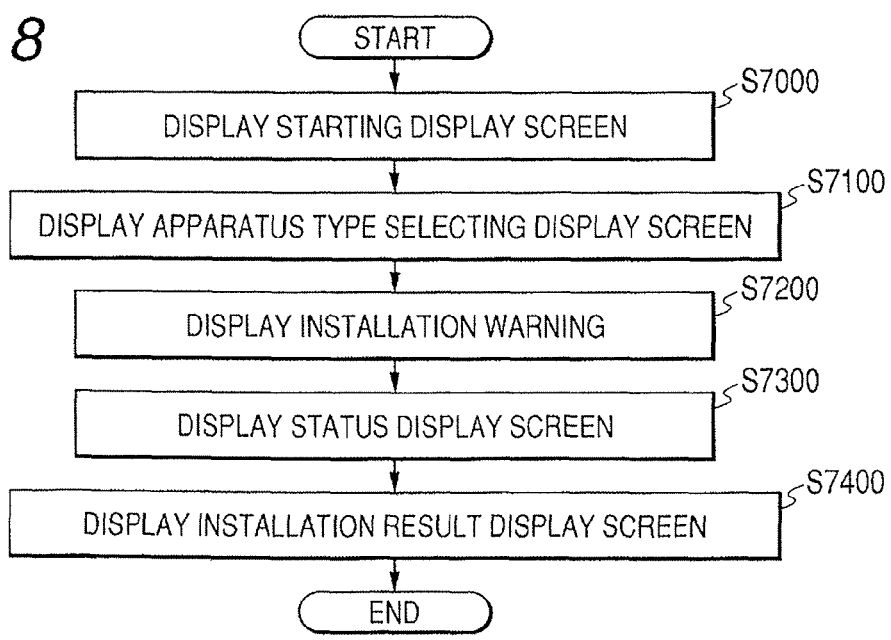
FIG. 8 is a flowchart showing an example of a fifth control processing procedure in the invention.

FIG. 8 is a flowchart showing an example of a fifth control processing procedure in the invention and corresponds to the detailed flow for the UI display at the time of the add-in installation by the add-in installer 106. That is, the processes in this flowchart are realized by a method whereby the program which corresponds to the add-in installer 106 and stored in the external memory 12 is executed in the RAM 2 by the CPU 1. In the flowchart, S7000 to S7400 indicate processing steps.

FIGS. 9 to 13 are schematic diagrams each illustrating an example of a display screen at the time of the UI displaying process upon add-in installation by the add-in installer 106.

Figure 9:
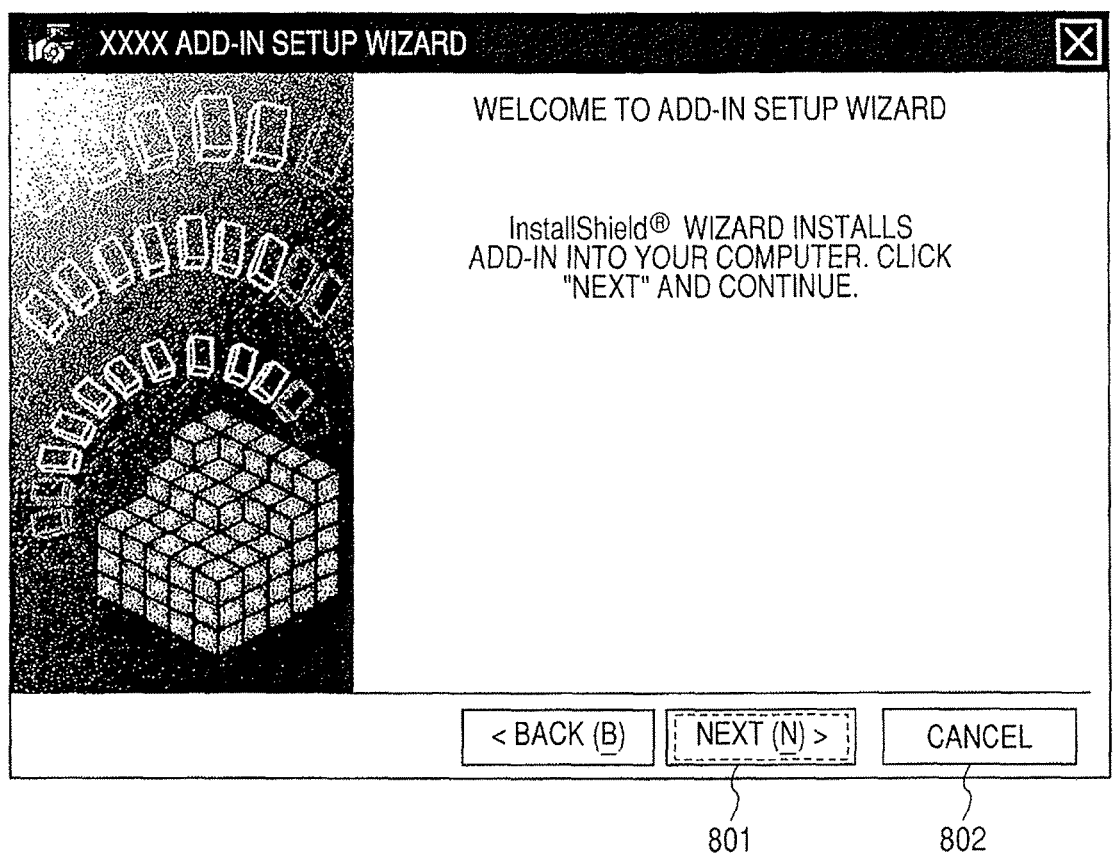
FIG. 9 is a schematic diagram illustrating an example of a display screen at the time of a UI displaying process upon add-in installation by an add-in installer.

First, when an add-in setup wizard is started, the add-in installer 106 displays a start display screen as illustrated in FIG. 9 onto the display 11 in step S7000.

In the start display screen illustrated in FIG. 9, when a "Next" button 801 is instructed (clicked by the PD 9), the add-in installer 106 advances the processing routine to step S7100 in FIG. 8.

Although not shown in the flowchart of FIG. 8, if a "Cancel" button 802 is instructed (clicked by the PD 9) in the start display screen illustrated in FIG. 9, the add-in installer 106 stops the processing routine of the flowchart of FIG. 8.

Figure 10A:
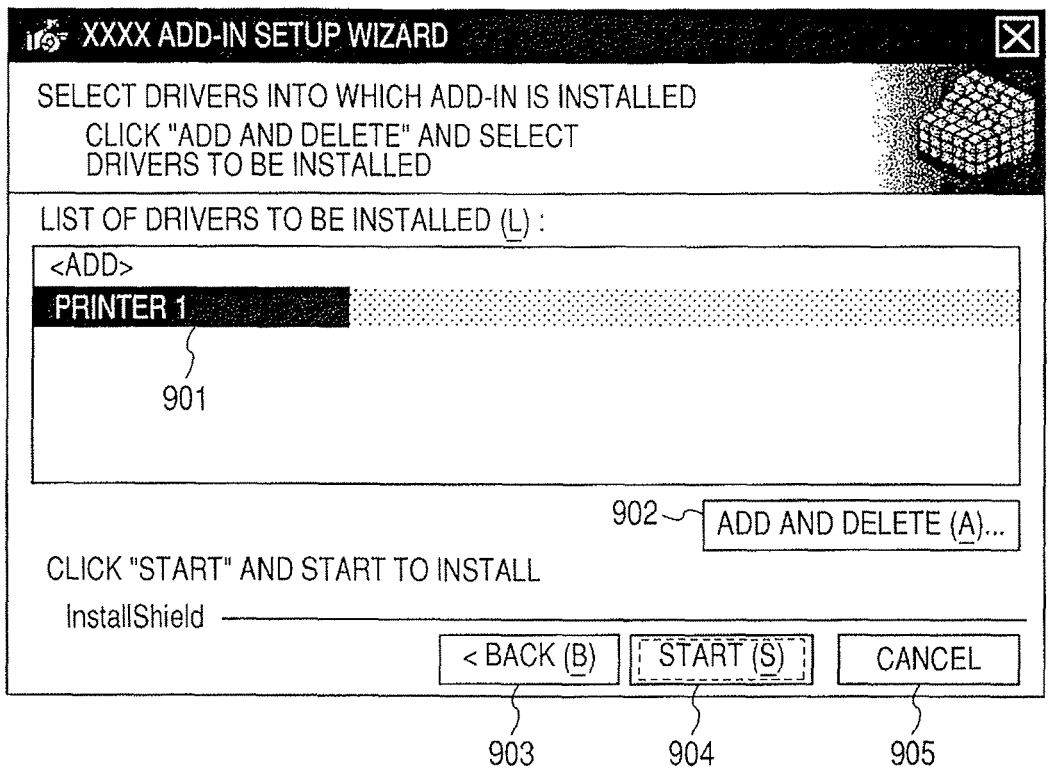
FIGS. 10A and 10B are schematic diagrams each illustrating an example of a display screen at the time of the UI displaying process upon add-in installation by the add-in installer.

Subsequently, the add-in installer 106 displays a driver type selecting display screen as illustrated in FIG. 10A onto the display 11 in step S7100 in FIG. 8.

In the driver type selecting display screen as illustrated in FIG. 10A, a list of the printer drivers which are at present the installation targets of the add-in module is displayed as shown by 901.

Figure 10B:
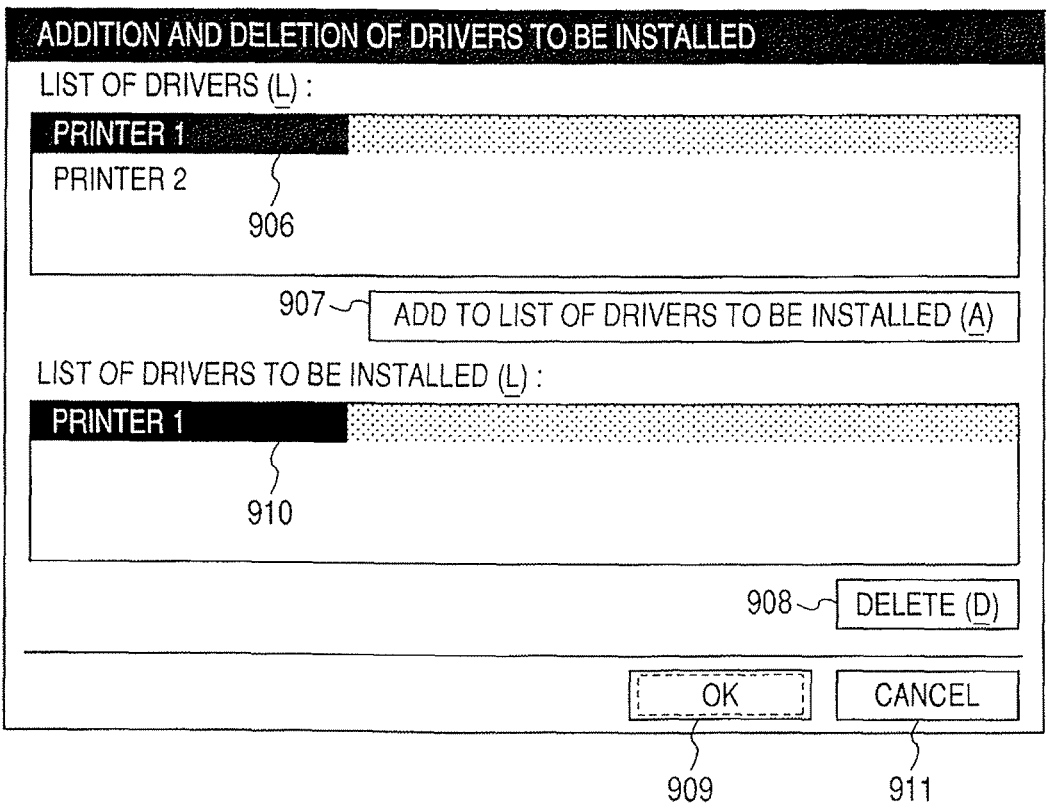

If an "Add and delete" button 902 is instructed (clicked by the PD 9) in the driver type selecting display screen, the add-in installer 106 displays a display screen as illustrated in FIG. 10B onto the display 11.

In the display screen illustrated in FIG. 10B, a list of the printer drivers to which the add-in module can be installed is displayed as shown by 906.

If an "Add to list of drivers to be installed" button 907 is instructed (clicked by the PD 9) in the display screen illustrated in FIG. 10B, the add-in installer 106 adds the printer driver selected in 906 to a list 910 of the printer drivers which are the installation targets of the add-in module.

If a "Delete" button 908 is instructed (clicked by the PD 9) in the display screen illustrated in FIG. 10B, the add-in installer 106 deletes the printer driver selected in 910 from the installation targets.

If an "OK" button 909 is instructed (clicked by the PD 9) in the display screen illustrated in FIG. 10B, the add-in installer 106 closes the display screen of FIG. 10B, reflects the contents of the list 910 to the list 901, and returns to the display screen of FIG. 10A.

If a "Cancel" button 911 is instructed (clicked by the PD 9) in the display screen illustrated in FIG. 10B, the add-in installer 106 closes the display screen of FIG. 10B and returns to the display screen of FIG. 10A.

If a "Back" button 903 is instructed (clicked by the PD 9) in the display screen illustrated in FIG. 10A, the add-in installer 106 returns the processing routine to step S7000 in FIG. 8.

If a "Start" button 904 is instructed (clicked by the PD 9) in the display screen illustrated in FIG. 10A, the add-in installer 106 advances the processing routine to step S7200 in FIG. 8.

Although not shown in the flowchart of FIG. 8, if a "Cancel" button 905 is instructed (clicked by the PD 9) in the display screen illustrated in FIG. 10A, the add-in installer 106 stops the processing routine of the flowchart in FIG. 8.

Figure 11:
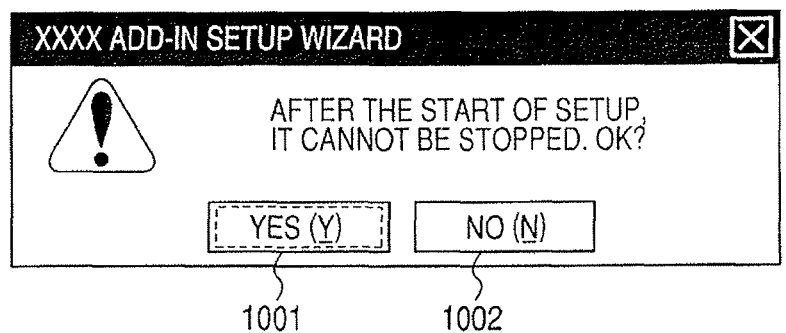
FIG. 11 is a schematic diagram illustrating an example of a display screen at the time of the UI displaying process upon add-in installation by the add-in installer.

In step S7200 in FIG. 8, the add-in installer 106 displays an installation warning display screen illustrated in FIG. 11 onto the display 11.

If a "No" button 1005 is instructed (clicked by the PD 9) in the display screen of FIG. 11, the add-in installer 106 stops the processing routine of the flowchart in FIG. 8 although not shown in the flowchart of FIG. 8.

If a "Yes" button 1001 is instructed (clicked by the PD 9) in the display screen of FIG. 11, the add-in installer 106 advances the processing routine to step S7300.

Figure 12:
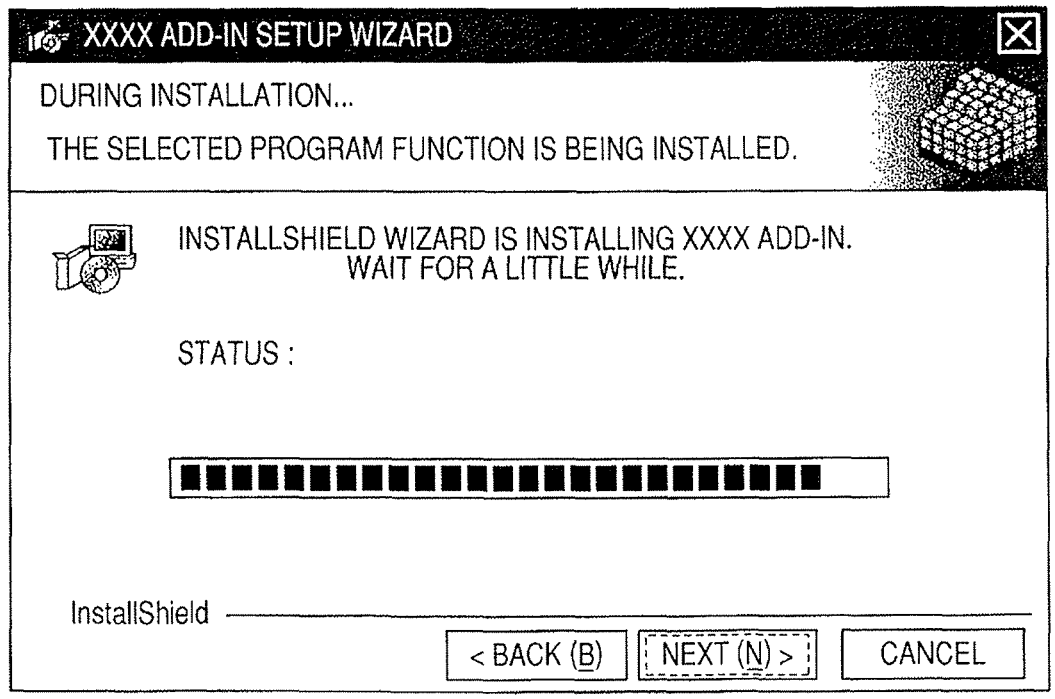
FIG. 12 is a schematic diagram illustrating an example of a display screen at the time of the UI displaying process upon add-in installation by the add-in installer.

In step S7300 in FIG. 8, the add-in installer 106 displays a status display screen as illustrated in FIG. 12 onto the display 11 and executes the processes (installing process) shown in the flowchart of FIG. 4.

After completion of the installing process shown in FIG. 4, the add-in installer 106 advances the processing routine to step S7400 in FIG. 8.

Figure 13:
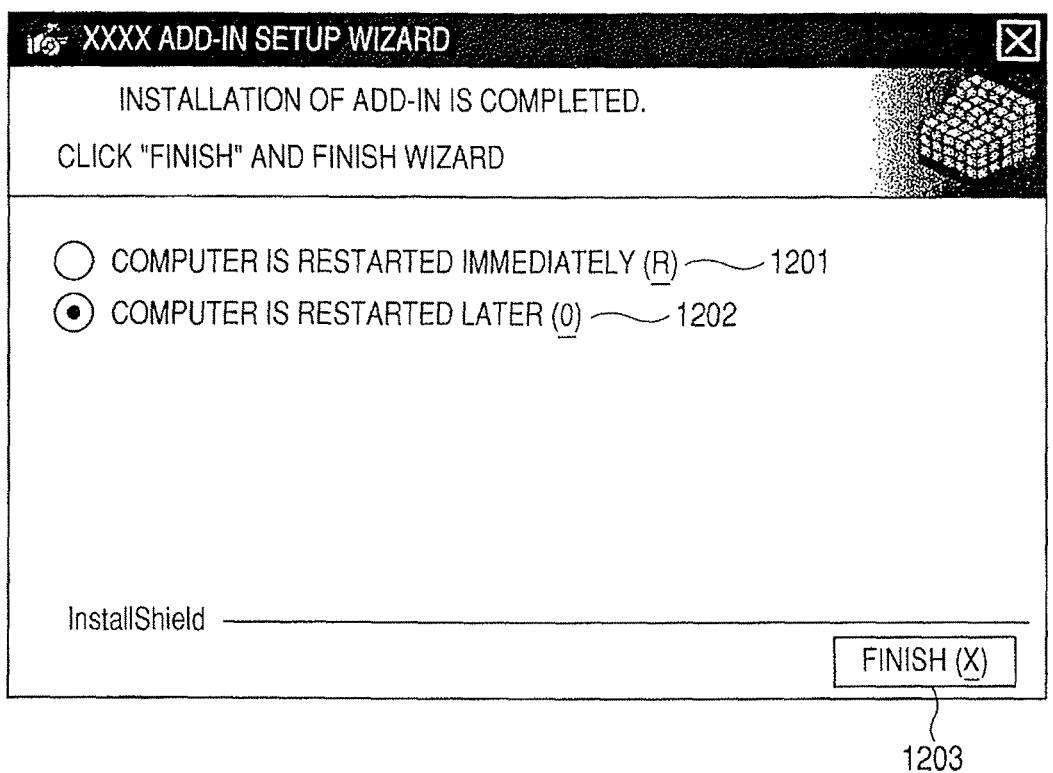
FIG. 13 is a schematic diagram illustrating an example of a display screen at the time of the UI displaying process upon add-in installation by the add-in installer.

In step S7400 in FIG. 8, the add-in installer 106 displays an installation result display screen as illustrated in FIG. 13 onto the display 11, thereby indicating whether or not the add-in installation is successful. The example illustrated in FIG. 13 corresponds to the case where the add-in installation is successful (has been completed) in the processing routine shown in FIG. 4.

If the proper installing order in the operation does not exist in the processing routine shown in FIG. 4, or the like, the add-in installer 106 displays a message showing that the add-in installation has failed onto the installation result display screen.

If an instruction 1201 is selected by the PD 9 and an "Finish" button 1203 is instructed (clicked by the PD 9) in the installation result display screen illustrated in FIG. 13, the add-in installer 106 closes the display screen of FIG. 13 and restarts the computer 100. Thus, the change of the printer driver 101 performed by the add-in installer 106 is reflected to the computer 100.

If an instruction 1202 is selected by the PD 9 and the "Finish" button 1203 is instructed (clicked by the PD 9) in the installation result display screen illustrated in FIG. 13, the add-in installer 106 closes the display screen of FIG. 13.

<Flow for Calling Process of Add-in Module 102>

Details of the printing process of the printer driver having the installed add-in module according to the embodiment will now be described with reference to FIGS. 1, 2, and 14.

The application 108, graphic engine 109, printer driver 101, and print service 105 exist as files stored in the external memory 12. They are program modules which are loaded into the RAM 2 and executed by the OS which is executed by the CPU 1 or by the module which uses those modules and are executed.

The application 108 and the printer driver 101 can be added into one of the FD and the CD-ROM of the external memory 12 or into the HD of the external memory 12 through the network 20 (not shown).

The application 108 stored in the external memory 12 is loaded into the RAM 2 and executed by the CPU 1. However, when the application 108 instructs the printer 30 to print, the output (drawing) is executed by using the graphic engine 109 which has similarly been loaded into the RAM 2 and can be executed.

The graphic engine 109 loads the printer driver 101 prepared every printing apparatus such as a printer into the RAM 2 from the external memory 12 and sets the output of the application 108 into the printer driver 101. The graphic engine 109 converts a GDI (Graphic Device Interface) function received from the application 108 into a DDI (Device Driver Interface) function and outputs to the printer driver 101.

The printer driver 101 converts the DDI function received from the graphic engine 109 into a control command which can be recognized by the printer, for example, a PDL (Page Description Language). The converted printer control command is output as print data to the printer 30 through the print service 105 loaded into the RAM 2 by the OS.

The print system of the embodiment has an add-in module processing unit 110 in the printer driver 101.

When executing the add-in module 102, the printer driver 101 calls the add-in module 102 through the add-in module processing unit 110 and executes the process. Details of the calling process of the add-in module 102 will be described with reference to FIG. 14.

Figure 14:
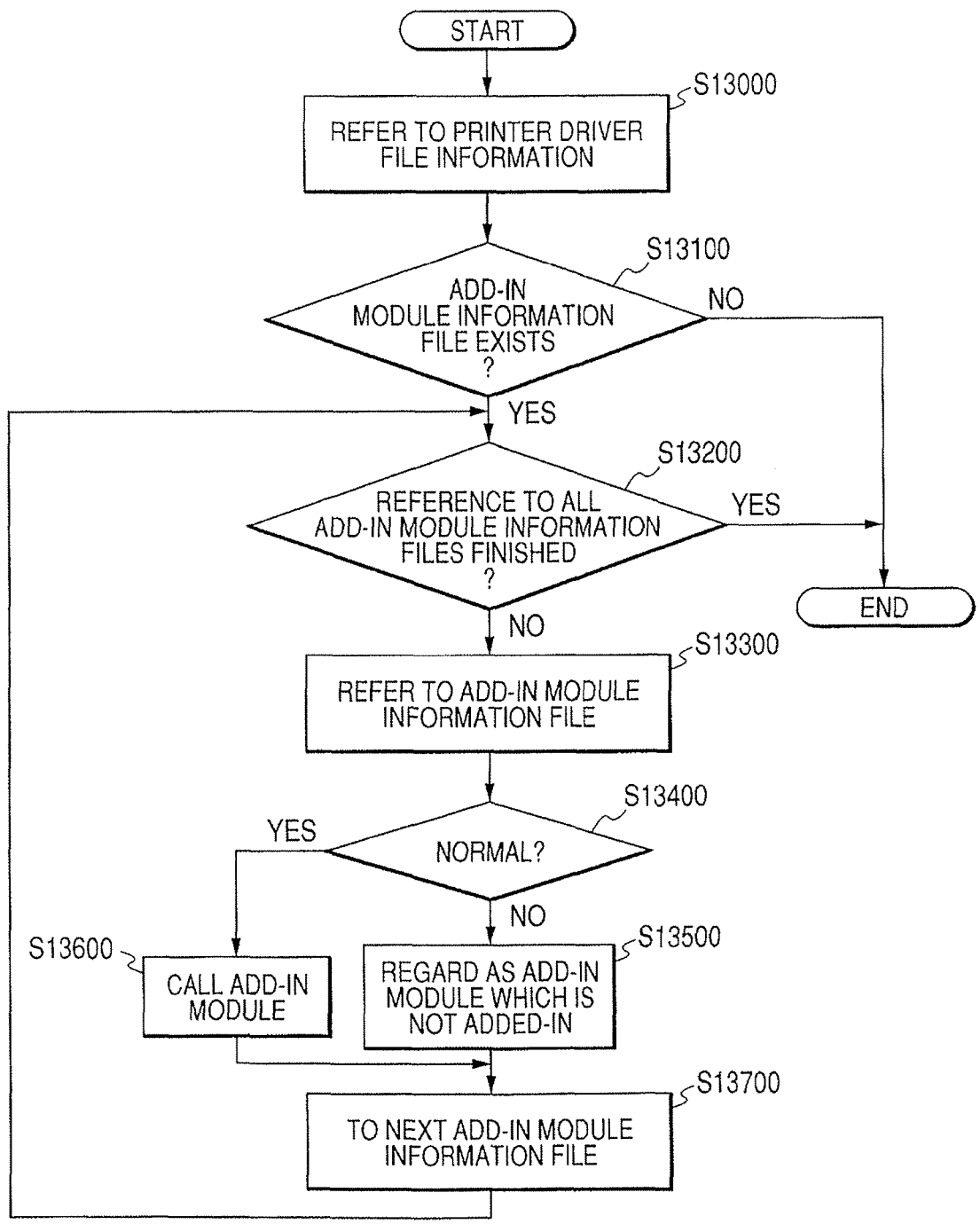
FIG. 14 is a flowchart showing an example of a sixth control processing procedure in the invention.

FIG. 14 is a flowchart showing an example of a sixth control processing procedure in the invention and corresponds to the detailed flow for the calling process of the add-in module by the printer driver 101. That is, the processes in this flowchart are realized by a method whereby the program which corresponds to the add-in installer 106 and has been stored in the external memory 12 is executed in the RAM 2 by the CPU 1. In the flowchart, S13000 to S13700 indicate processing steps.

First, in step S13000, the printer driver 101 obtains the construction information regarding the printer driver 101 with reference to the printer driver file information 104.

Subsequently, in step S13100, the printer driver 101 discriminates whether or not the add-in module information file 103 exists. In this discriminating step, when at least one file information (add-in module file information 111) regarding the add-in module information file 103 is included in the construction information obtained in step S13000, it is determined that the add-in module information file 103 exists. If none of the add-in module file information 111 is included in the construction information, it is determined that the add-in module information file 103 does not exist. In the embodiment, if the processing routine of FIG. 7 is executed, the add-in module file information 111 has been registered in the printer driver file information 104 in order from the smaller operating order.

If it is determined in step S13100 that the add-in module information file 103 does not exist, the printer driver 101 finishes the processing routine of this flowchart as it is.

If it is determined in step S13100 that the add-in module information file 103 exists, the printer driver 101 advances the processing routine to step S13200.

In step S13200, the printer driver 101 discriminates whether or not the reference to all of the add-in module information files registered in the construction information obtained in step S13000 has been finished.

If it is determined in step S13200 that the reference to all of the add-in module information files 103 is not finished yet, the printer driver 101 advances the processing routine to step S13300.

In step S13300, the printer driver 101 selects one of the add-in module information files 103 which have been registered in the construction information obtained in step S13000 and are not referred to yet, and refers to the information in the selected add-in module information file 103.

In next step S13400, the printer driver 101 discriminates whether or not the information in the add-in module information file has normally been referred to in step S13300.

If it is determined in step S13400 that the information in the add-in module information file is not normally referred to in step S13300, the printer driver 101 advances the processing routine to step S13500.

In step S13500, the printer driver 101 regards that this add-in module is not normally operating, that is, the add-in of this add-in module is not performed, and advances the processing routine to step S13700.

If it is determined in step S13400 that the information in the add-in module information file has normally been referred to in step S13300, the printer driver 101 advances the processing routine to step S13600.

In step S13600, the printer driver 101 calls the add-in module which has been referred to in step S13300.

The printer driver 101 confirms the presence or absence of other add-in modules which are inconvenient to the operation of the target add-in module called in step S13600. If there are the inconvenient add-in modules, precision of the order control can be also raised by displaying a warning display screen onto the display 11. For example, if the module which intends to limit the function is called as a target module, the target module adds a hash value to the data as alteration detection in order to prevent that the function limitation due to the rewriting from the module at the post stage is invalidated. The hash value is a value representing data calculated according to a certain rule. For example, the alteration can be detected by comparing a hash value embedded on the host side with a hash value obtained on the device side.

There is considered a case where a module such as an encrypted module has been found as a calling module at the post stage in the add-in module information file 103; that is, such an encrypted module that the rewriting is performed by further executing an encryption by using a key serving as an encryption table to the print data. In this manner, if the encrypted module as mentioned above is executed after the hash value as mentioned above was calculated, the hash value which is obtained by the encryption also becomes a different value, so that it is detected that the alteration has been performed. Therefore, a message to stop the printing and uninstall the relevant module, a message to change the order of the encrypted module and the function limiting module including the alteration detection and install, or the like is displayed.

That is, after the process of the alteration detecting module of a job, if the encrypted module operates and encrypts the job, there is a case where in spite of the fact that the data before the encryption is not altered, it is detected that the data has been altered. In such a case, it is proper to execute the process of the alteration detecting module of the job after the encrypting process.

Description will be returned to the flowchart hereinbelow.

When the process of step S13600 is finished, the printer driver 101 advances the processing routine to step S13700.

In step S13700, the printer driver 101 advances the processing routine to the reference to the next add-in module information file and returns the processing routine to step S13200.

If it is determined in step S13200 that the reference to all of the add-in module information files has been finished, the printer driver 101 finishes the processing routine of this flowchart.

As described above, according to the embodiment, when the add-in module is added to the printer driver, the setup control can be made so that the operating order (applying order) of the add-in module to be added and the existing add-in modules constructing the printer driver is made correct.

Therefore, upon execution of the printing process, the printer driver can apply the add-in modules constructing the printer driver to the proper order (order adapted to make the add-in modules operative) and enables the add-in modules to properly operate.

Second Embodiment

Although the first embodiment has been described with respect to the case where the add-in module is added to the printer driver, in the second embodiment, a case where a filter module which is provided by a filter construction in "Filer Pipeline" of Windows (registered trademark) Vista is added to the printer driver will now be described. It is assumed that a hardware construction is similar to that in the first embodiment.

<System Construction>

Figure 15:
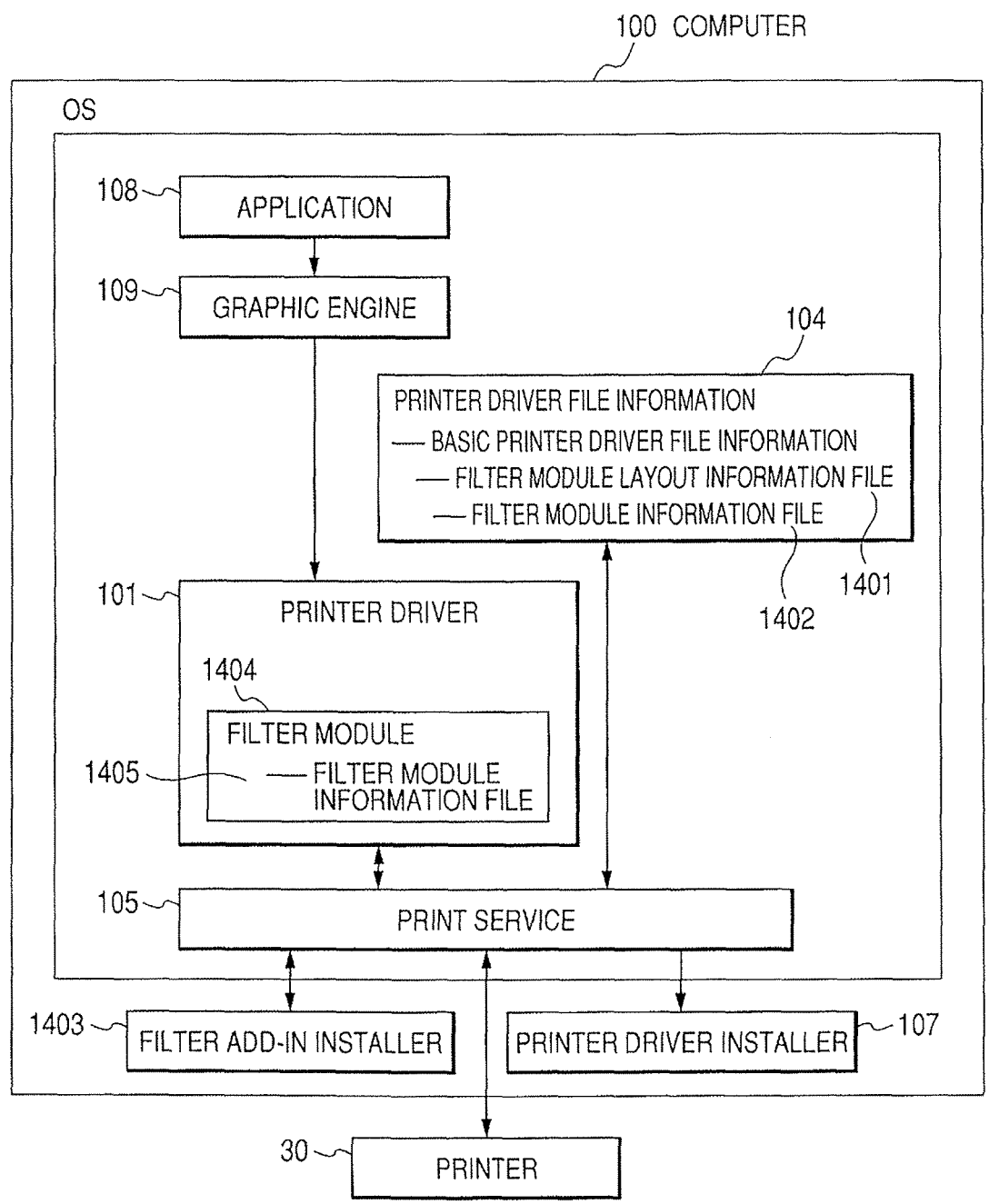
FIG. 15 is a block diagram illustrating a constructional example of a print system according to the second embodiment of the invention.

FIG. 15 is a block diagram illustrating a constructional example of a print system according to the second embodiment of the invention and the same component elements as those in FIG. 2 are designated by the same reference numerals.

In FIG. 15, layout information 1401 of a filter module is provided by a filter construction in the printer driver 101. The layout information 1401 specifies calling order of a filter module 1404. In Windows (registered trademark) Vista, the filter module layout information file 1401 corresponds to "Filter Configuration File".

The filter module 1404 constructs the printer driver and includes a filter module information file 1405. A data construction of the filter module information file 1405 will now be described with reference to FIG. 16.

Figure 16:
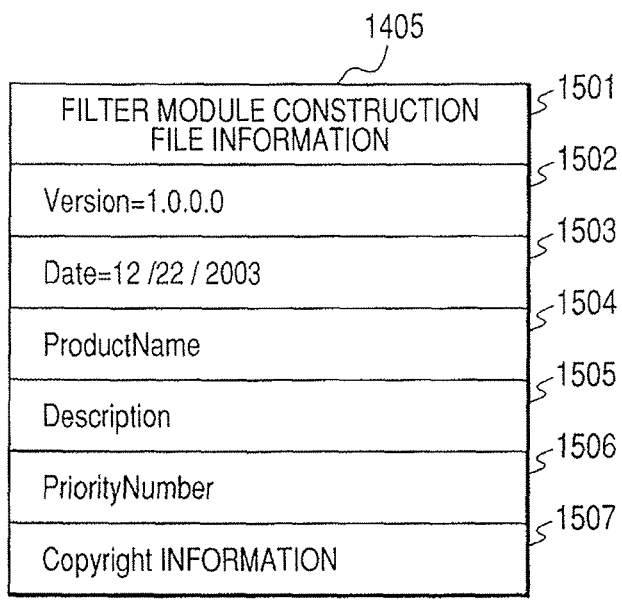
FIG. 16 is a data constructional diagram showing a data construction of a filter module information file illustrated in FIG. 15.

FIG. 16 is a data constructional diagram showing the data construction of the filter module information file 1405 illustrated in FIG. 15.

In FIG. 16, a file construction of the filter module 1404 has been described in an area 1501. Version information of the filter module 1404 has been described in an area 1502. A release date of the filter module 1404 has been described in an area 1503. Product name information of the filter module 1404 has been described in an area 1504. Detailed information of the filter module 1404 has been described in an area 1505.

PriorityNumber (priority number), that is, the unconditional number which decides the operating order has been described in an area 1506. Copyright information of the filter module 1404 has been described in an area 1507.

The Printer driver file information 104 is one management information for allowing the OS to use the printer driver by using the print service 105. For example, in Windows (registered trademark), "DependentFiles" in the registry corresponds to the printer driver file information 104.

Description will be returned to FIG. 15 hereinbelow.

The printer driver 101 can hold zero or one or more filter modules. The filter module 1404 is a file group including program files such as a DLL (Dynamic Link Library) and the like.

In FIG. 15, the filter module 1404 has been installed and the filter module layout information file 1401 has been registered in the printer driver file information 104. Information (for example, filter module information file name) 1402 to specify the filter module information file is included in the filter module layout information file 1401.

In the case where a plurality of filter modules have been installed in the printer driver 101, the information 1402 to specify the filter module information file is included in the filter module layout information file 1401 every filter module (calling order).

A filter add-in installer 1403 is a main device to accomplish the object of the invention and is a program for additionally installing the filter module 1404 into the installed printer driver 101. It is assumed that the filter module file which is additionally installed has been stored in the filter add-in installer 1403 or in another storing area in the external memory 12.

The filter add-in installer 1403 mainly has the following functions (1) to (6).

Construction filter module detecting function for detecting one or a plurality of filter modules constructing one or a plurality of printer drivers.

Filter module proper operating order discriminating function for discriminating the order of the proper operations of the filter module and one or a plurality of filter modules constructing the printer driver (order adapted to make the plurality of filter modules operative).

File adding function for adding the filter module file.

Filter module layout information changing function for changing filter module layout information according to the above operating order (so that the filter modules operate in the above operating order.

File registering function for registering the added additional file into the printer driver file information 104.

Recognizing function for allowing the print service to recognize the change in module construction.

A flow for processes in the filter add-in installer 1403 will be described in detail with reference to FIG. 17 and subsequent diagrams, which will be described hereinafter.

<Flow for Process in the Filter Add-in Installer 1403>

Figure 17:
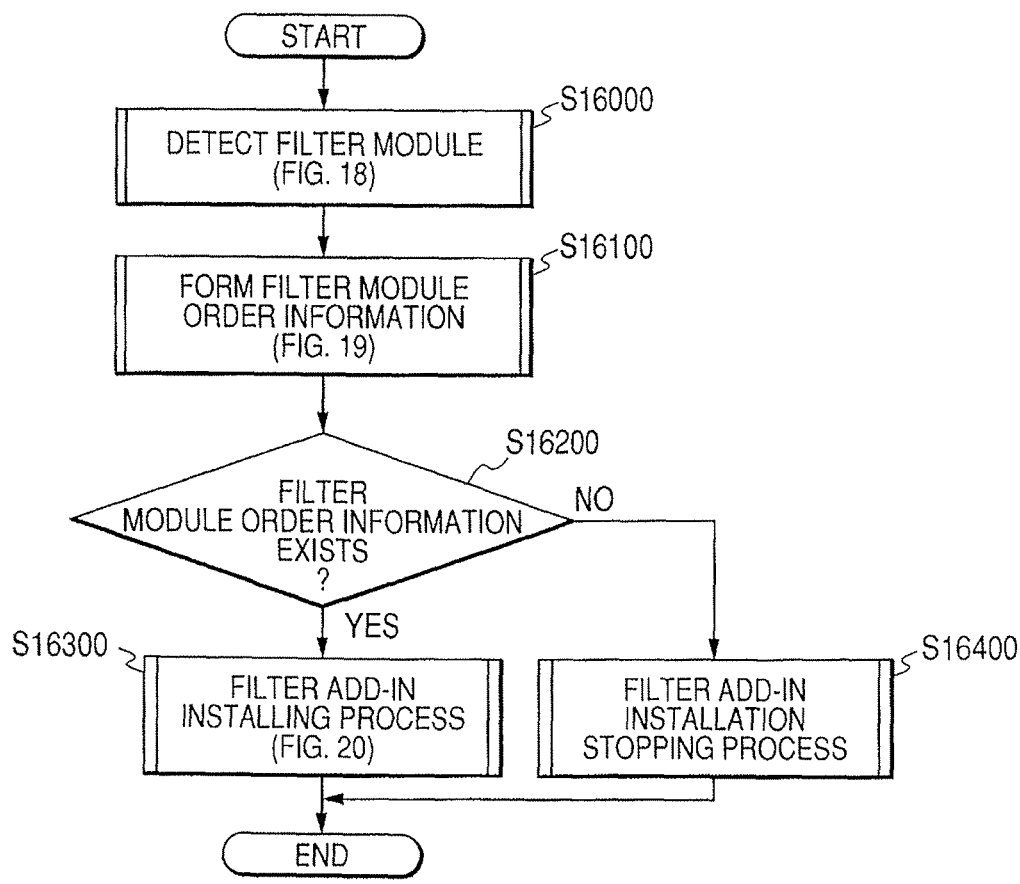
FIG. 17 is a flowchart showing an example of a seventh control processing procedure in the invention.

FIG. 17 is a flowchart showing an example of a seventh control processing procedure in the invention and corresponds to the detailed flow for the process of the filter add-in installer 1403. That is, the processes in this flowchart are realized by a method whereby the program which corresponds to the add-in installer 106 and has been stored in the external memory 12 is executed in the RAM 2 by the CPU 1. In the flowchart, S16000 to S16400 indicate processing steps.

First, in step S16000, the filter add-in installer 1403 detects the installed filter module with respect to the additional target printer driver of the filter module. The additional target printer driver of the filter module is a printer driver which has already been installed in the computer 100. The driver selected by the user as an additional target of the filter module corresponds to the additional target printer driver of the filter module. It is assumed here that the printer driver 101 in FIG. 15 corresponds to such a driver. Details of the process of step S16000 will be described in FIG. 18.

Subsequently, in step S16100, the filter add-in installer 1403 forms filter module order information. According to this process, in a printing process in which the installed filter module 1404 detected in step S16000 and the filter module to be added by the filter add-in installer 1403, filter module order information which holds proper order information (order adapted to make the plurality of filter modules operative) is formed. The filter module order information is formed only when the order in which the filter modules can operate properly (order adapted to make the plurality of filter modules operative) exists.

As a holding format of the filter module order information, although a format such as file format or format in which such information is held in the RAM 2 is not limited, description will be made here on the assumption that such information is held in the RAM 2. In the filter module order information, the number showing the order and a module name are held as a minimum information construction. Details of the process of step S16100 will be described in FIG. 19.

Subsequently, in step S16200, the filter add-in installer 1403 discriminates whether or not the filter module order information exists in the RAM 2. If it is determined that the filter module order information does not exist in the RAM 2, the filter add-in installer 1403 advances a processing routine to step S16400.

The filter add-in installer 1403 stops the filter module installing process in step S16400 and finishes the processing routine of this flowchart.

If it is determined in step S16200 that the filter module order information exists in the RAM 2, the filter add-in installer 1403 advances the processing routine to step S16300.

The filter add-in installer 1403 executes the filter module installing process in step S16300 and finishes the processing routine of this flowchart. Details of the process in step S16300 will be described in FIG. 20.

Figure 18:
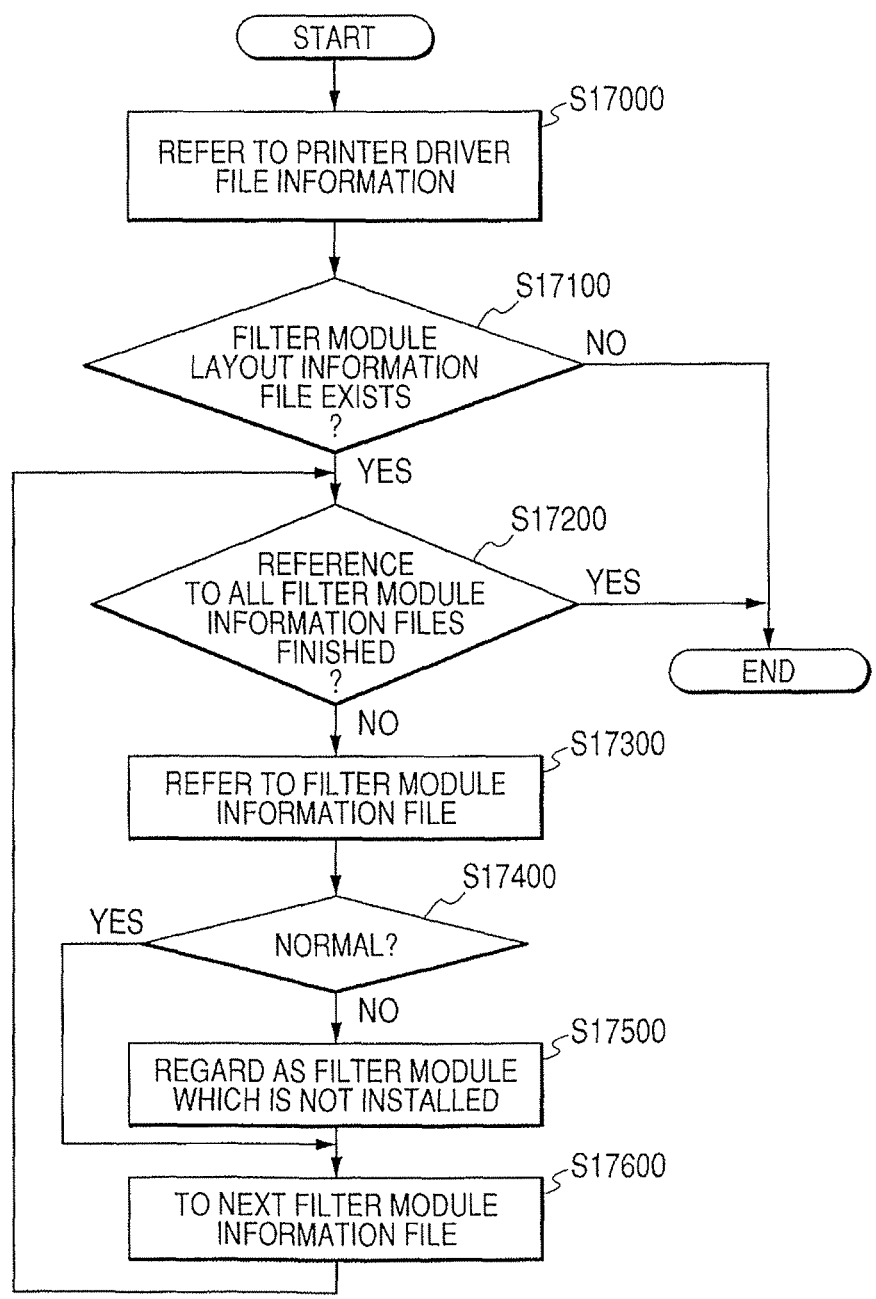
FIG. 18 is a flowchart showing an example of a eighth control processing procedure in the invention.

FIG. 18 is a flowchart showing an example of an eighth control processing procedure in the invention and corresponds to the detailed flow for the filter module detecting process shown in step S16000. That is, the processes in this flowchart are realized by a method whereby the program which corresponds to the filter add-in installer 1403 and has been stored in the external memory 12 is executed in the RAM 2 by the CPU 1. In the flowchart, S17000 to S17600 indicate processing steps.

First, in step S17000, the filter add-in installer 1403 obtains the construction information regarding the printer driver 101 with reference to the printer driver file information 104.

Subsequently, in step S17100, the filter add-in installer 1403 discriminates whether or not the filter module layout information file 1401 exists in the construction information obtained in step S17000.

If it is determined in step S17100 that the filter module layout information file 1401 does not exist, the filter add-in installer 1403 finishes the processing routine of this flowchart as it is and advances the processing routine to step S16100 in FIG. 17.

If it is determined in step S17100 that the filter module layout information file 1401 exists, the filter add-in installer 1403 advances the processing routine to step S17200.

In step S17200, the filter add-in installer 1403 discriminates whether or not the reference to all of the filter module information files 1405 registered in the filter module layout information file 1401 has been finished.

If it is determined in step S17200 that the reference to all of the filter module information files 1405 is not finished yet, the filter add-in installer 1403 advances the processing routine to step S17300.

In step S17300, the filter add-in installer 1403 selects one of the filter module information files 1405 which have been registered in the filter module layout information file 1401 and are not referred to yet, and refers to the information in the selected filter module information file 1405.

In next step S17400, the filter add-in installer 1403 discriminates whether or not the information in the filter module information file 1405 has normally been referred to in step S17300.

If it is determined in step S17400 that the information in the filter module information file 1405 is not normally referred to in step S17300, the filter add-in installer 1403 advances the processing routine to step S17500.

In step S17500, the filter add-in installer 1403 regards that this filter module is not normally operating, that is, it is not installed, and advances the processing routine to step S17600.

If it is determined in step S17400 that the information in the filter module information file 1405 has normally been referred to in step S17300, the filter add-in installer 1403 advances the processing routine to step S17600.

In step S17600, the filter add-in installer 1403 advances the processing routine to the reference to the next filter module information file 1405 and returns the processing routine to step S17200.

If it is determined in step S17200 that the reference to all of the filter module information files 1405 registered in the filter module layout information file 1401 has been finished, the filter add-in installer 1403 finishes the processing routine of this flowchart and advances the processing routine to step S16100 in FIG. 17.

In this manner, the detailed operation of the filter module detecting process shown in step S16000 in FIG. 17 is executed. If a plurality of printer drivers to which the filter module is added are selected, processes similar to those mentioned above are repeated the number of times corresponding to the number of printer drivers which are selected.

Figure 19:
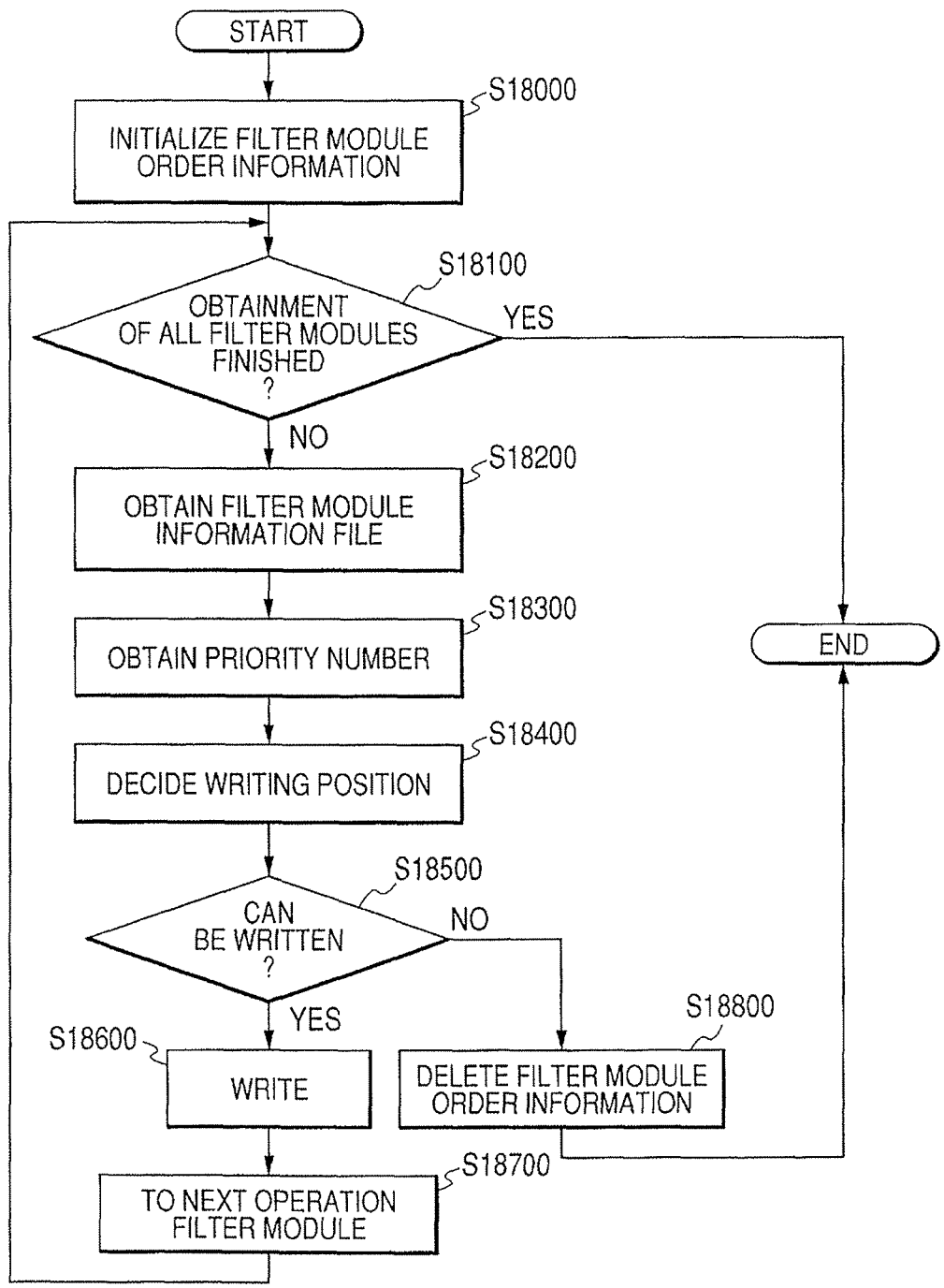
FIG. 19 is a flowchart showing an example of a ninth control processing procedure in the invention.

FIG. 19 is a flowchart showing an example of a ninth control processing procedure in the invention and corresponds to the detailed flow for the filter module order information forming process shown in step S16100 in FIG. 17. That is, the processes in this flowchart are realized by a method whereby the program which corresponds to the filter add-in installer 1403 and has been stored in the external memory 12 is executed in the RAM 2 by the CPU 1. In the flowchart, S18000 to S18800 indicate processing steps.

First, in step S18000, the filter add-in installer 1403 executes an initializing process such as a process to newly form filter module order information and the like.

In step S18100, the filter add-in installer 1403 discriminates whether or not the obtainment of the filter information files of all of the filter modules detected in step S16000 in FIG. 17 and all of the filter modules to be added from now on has been finished for the addition target printer drivers of the filter modules. That is, the filter installer 1403 discriminates whether or not the forming process of the filter module order information has been completed.

If it is determined in step S18100 that the obtainment of the filter module information files of all of the filter modules detected in step S16000 in FIG. 17 and all of the filter modules to be added from now on is not finished yet, the filter add-in installer 1403 advances the processing routine to step S18200.

In step S18200, the filter add-in installer 1403 obtains one of the filter module information files 1405 which are not obtained yet among the filter modules detected in step S16000 in FIG. 17 and the filter modules to be added from now on. The filter module corresponding to the obtained filter module information file 1405 is hereinbelow called a "filter module which is highlighted at present".

In step S18300, the filter add-in installer 1403 obtains the PriorityNumber 1506 from the filter module information file 1405 obtained in step S18200. The PriorityNumber denotes, for example, an integer of 1 or more and defines the operating order according to a magnitude of a numerical value. By this PriorityNumber, it is also possible to cope with the case where the module has newly been added.

In step S18400, the file add-in installer 1403 compares the PriorityNumbers of the filter modules which have already been written in the filter module order information until this processing step with the PriorityNumber of the filter module which is highlighted at present. The filter add-in installer 1403 determines the order (writing positions into the filter module order information) so as to become the ascending order of the PriorityNumbers.

Subsequently, in step S18500, the filter add-in installer 1403 discriminates whether or not the PriorityNumbers can be written to the writing positions determined in step S18400. As a case where the PriorityNumbers cannot be written, a case where the PriorityNumbers are the same or a competition of the modules which cannot coexist or the like has occurred is considered.

If it is determined in step S18500 that the writing is impossible, the filter add-in installer 1403 advances the processing routine to step S18800.

In step S18800, the filter add-in installer 1403 determines that the proper order (operating order adapted to make operative the filter modules which have previously been added and the filter modules which are added from now on) does not exist, and deletes the filter module order information held in the RAM 2 at present. The filter add-in installer 1403 displays a message to the display 11 in a step (not shown) in order to notify the user that the proper order (order adapted to make the filter modules operative) to which the modules are applied does not exist because PriorityNumbers are the same or such a competition that the modules cannot coexist or the like has occurred. The filter add-in installer 1403 finishes the processing routine of this flowchart and advances the processing routine to step S16200 in FIG. 17.

If it is determined in step S18500 that the writing is possible, the filter add-in installer 1403 advances the processing routine to step S18600.

In step S18600, the filter add-in installer 1403 writes the name of the filter module which is highlighted at present to the writing position in the filter module order information decided in step S18400. In the embodiment, the number showing the order and the filter module name are written.

Subsequently, in step S18700, the filter add-in installer 1403 advances the processing routine to the next filter module information file and returns the processing routine to step S18100.

If it is determined in step S18100 that the obtainment of the filter module information files of all of the filter modules detected in step S16000 in FIG. 17 and all of the filter modules to be added from now on has been finished, the filter add-in installer 1403 finishes the processes in this flowchart and advances the processing routine to step S16200 in FIG. 17.

In this manner, the detailed operation of the filter module order information forming process shown in step S16100 in FIG. 17 is executed. If a plurality of printer drivers to which the filter module is added are selected, processes similar to those mentioned above are repeated the number of times corresponding to the number of printer drivers which are selected.

Although each filter module holds the PriorityNumber and the filter module order information is formed in FIG. 19, the filter module order information can be provided as file information from the outside. For example, it is also possible to construct the system in such a manner that the filter module order information is opened as file information on the Web and it is obtained and provided from the Web.

The filter module order information may have a text format such as XML or a non-readable binary format and its data format is not limited.

Figure 20:
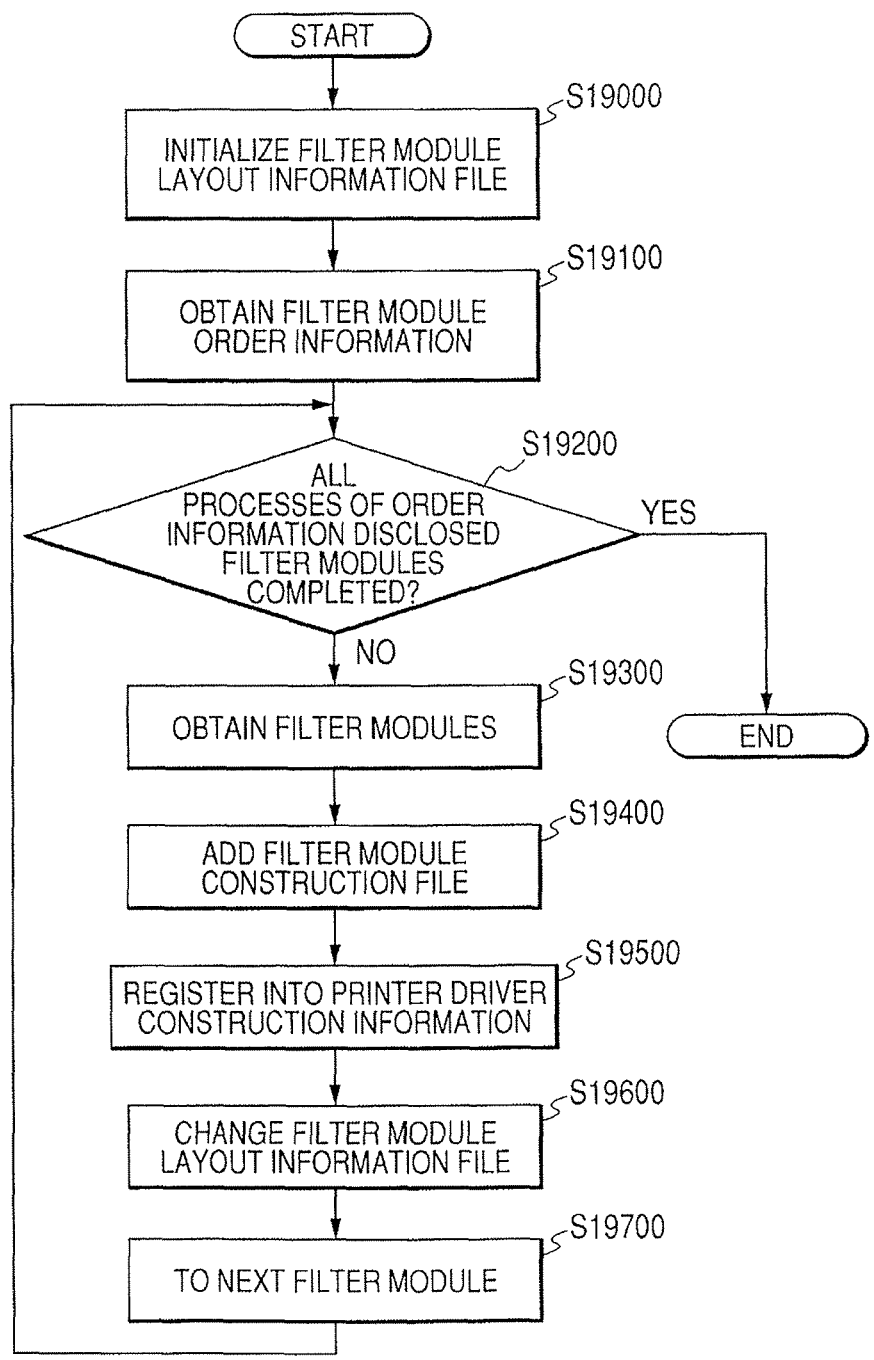
FIG. 20 is a flowchart showing an example of a tenth control processing procedure in the invention.

FIG. 20 is a flowchart showing an example of a tenth control processing procedure in the invention and corresponds to the detailed flow for the filter module add-in installing process shown in step S16300 in FIG. 17. That is, the processes in this flowchart are realized by a method whereby the program which corresponds to the filter add-in installer 1403 and has been stored in the external memory 12 is executed in the RAM 2 by the CPU 1. In the flowchart, S19000 to S19700 indicate processing steps.

First, in step S19000, the filter add-in installer 1403 initializes the filter module layout information file 1401 registered in the printer driver file information 104. In this step, the information 1402 to specify each filter module information file described in the filter module layout information file 1401 is deleted once.

Subsequently, in step S19100, the filter add-in installer 1403 obtains the filter module order information formed in step S16100.

In next step S19200, the filter add-in installer 1403 discriminates whether or not the add-in installing process of all of the filter modules written in the filter module order information obtained in step S19100 has been completed.

If it is determined in step S19200 that the add-in installing process of all of the filter modules written in the filter module order information obtained in step S19100 is not completed, the filter add-in installer 1403 advances a processing routine to step S19300.

In step S19300, the filter add-in installer 1403 obtains one filter module (filter module construction file) from the smaller operating order according to the filter module order information.

Subsequently, in step S19400, the filter add-in installer 1403 adds the filter module construction file obtained in step S19300 to a predetermined area in the external memory 12 (storing area in the OS). It is assumed that this processing step is executed only to the filter module which is newly additionally installed this time and it is skipped with respect to the filter modules which have previously been added.

In next step S19500, the filter add-in installer 1403 registers the filter module into the printer driver construction information (printer driver file information 104) obtained in step S6400.

In next step S19600, the filter add-in installer 1403 adds the information 1402 to specify the filter module information file of the added filter module to a termination of the filter construction of the present filter module layout information file.

In next step S19700, the filter add-in installer 1403 advances the processing routine to the next filter module written in the filter module order information and returns the processing routine to step S19200.

If it is determined in step S19200 that the installing process of all of the filter modules written in the filter module order information has been completed, the filter add-in installer 1403 finishes the processes of this flowchart.

By executing the installing process as mentioned above, the new filter module can be registered in such a manner that the filter modules which have previously been added and the filter modules which were newly added can execute the processes in the operating order decided in step S16100 in FIG. 17.

<With Respect to Filter Add-in Installer UI>

A filter add-in installer UI is similar to the add-in installer UI in the foregoing first embodiment. It is now assumed that as for the add-in installing process itself, the processes of FIG. 4 are replaced by the processes of FIG. 17.

<Flow for Calling Process of Filter Module 1404>

Details of the printing process of the printer driver having the filter module installed by the embodiment will be described with reference to FIGS. 1, 15, and 21. The same component elements as those in the drawings used in the first embodiment are designated by the same reference numerals.

In "XPS (XML Paper Specification) Print Path" of Windows (registered trademark) Vista, the graphic engine 109 outputs one of a drawing command and an XPS document which are received from the application 108 to the printer driver 101 as an XPS document.

The printer driver 101 converts the XPS document received from the graphic engine 109 into a control command which can be recognized by the printer, for example, a PDL (Page Description Language). In the print system of the embodiment, the OS calls the filter module 1404 in the printer driver 101, so that the printing is executed. When executing the filter module 1404, the printer driver 101 calls the filter module 1404 through the OS and executes the process. Details of the calling process of the filter module will be described with reference to FIG. 21.

Figure 21:
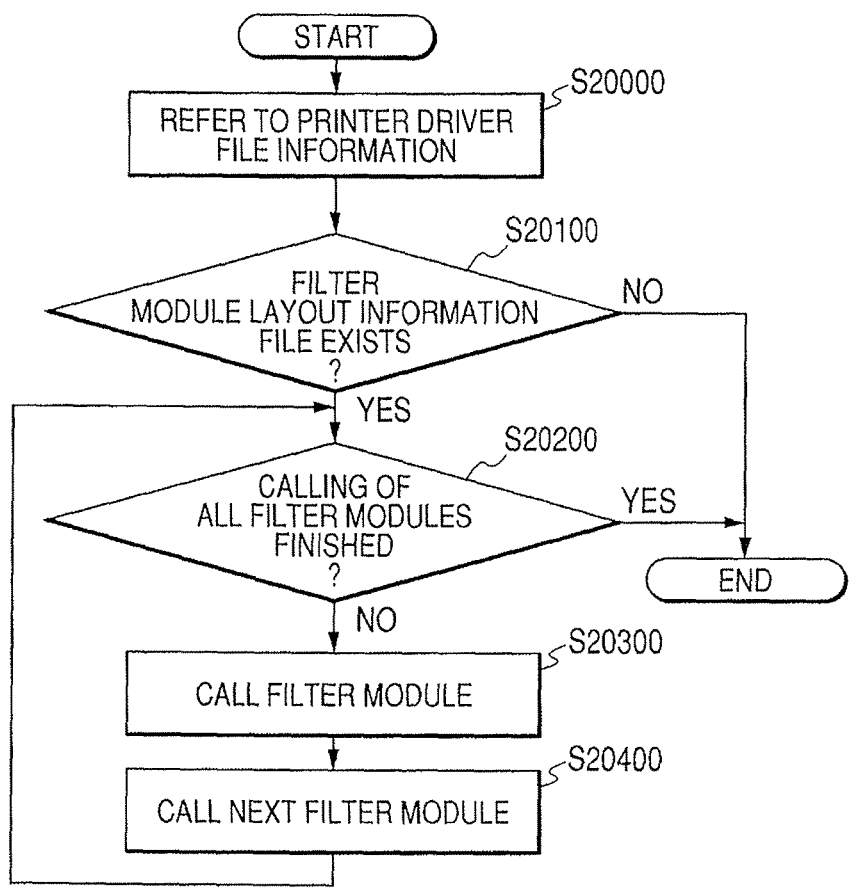
FIG. 21 is a flowchart showing an example of an eleventh control processing procedure in the invention.

FIG. 21 is a flowchart showing an example of an eleventh control processing procedure in the invention and corresponds to the detailed flow for the calling process of the filter module by the printer driver 101. That is, the processes in this flowchart are realized by a method whereby the program which corresponds to the add-in installer 106 and has been stored in the external memory 12 is executed in the RAM 2 by the CPU 1. In the flowchart, S20000 to S20400 indicate processing steps.

First, in step S20000, the printer driver 101 obtains the construction information regarding the printer driver 101 with reference to the printer driver file information 104.

Subsequently, in step S20100, the printer driver 101 discriminates whether or not the filter module layout information file 1401 exists in the construction information obtained in step S20000. In the embodiment, as for the filter module layout information file 1401, the information 1402 to specify the filter module information file is registered in order from the smaller operating order by the processes shown in FIG. 20.

If it is determined in step S20100 that the filter module layout information file 1401 does not exist, the printer driver 101 finishes the processing routine of this flowchart as it is.

If it is determined in step S20100 that the filter module layout information file 1401 exists, the printer driver 101 advances the processing routine to step S20200.

In step S20200, the printer driver 101 discriminates whether or not the calling of all of the filter modules 1404 registered in the filter module layout information file 1401 has been finished.

If it is determined in step S20200 that the calling of all of the filter modules 1404 is not finished yet, the printer driver 101 advances the processing routine to step S20300.

In step S20300, the printer driver 101 selects one of the filter modules 1404 which have been registered in the filter module layout information file 1401 and are not called yet, and calls the selected filter module 1404.

As described above, according to the embodiment, when the filter module is added to the printer driver, the setup control can be made so that the operating order (applying order) upon printing process of the filter module to be added and the existing filter modules constructing the printer driver is made correct.

Therefore, upon execution of the printing process, the printer driver can apply the filter modules constructing the printer driver to the proper order (order adapted to make the filter modules operative) and enables the filter modules to properly operate.

Although the first and second embodiments have been described with respect to the construction in which when the new module is added to the printer driver, the new module is added in such a manner that the operating order (applying order) at the time of the printing process of the module to be added and the existing modules constructing the printer driver is made correct and the registration state of the existing modules is changed and controlled.

However, by executing the processes of the flowcharts shown in FIGS. 4 to 8 or FIGS. 17 to 20 in the state where there are no modules to be newly added, the registration of the existing modules can be changed and controlled so that the operating order (applying order) at the time of the printing process of the existing modules is made correct.

For example, in the case where the user added the new module by the conventional method without executing the processes of the flowcharts shown in FIGS. 4 to 8 or FIGS. 17 to 20, the operating order of the new module compared with that of the modules which have already been installed is not considered, so that there is a case where the new module does not normally operate.

In such a case, since the modules themselves have already been added, the processes of the flowcharts shown in FIGS. 17 to 20 are executed in the state where there are no modules to be newly added. Thus, although the installer does not add any new module but changes and controls the registration of the existing modules so that the operating order (applying order) of the modules which have already been installed is made correct.

Each of the above embodiments has been described with respect to the application control of the module by the installer and the printer driver for adding one or a plurality of add-in modules (filter modules) to one or a plurality of printer drivers installed into the computer.

However, the target to which the add-in module or the like is added is not limited to the printer driver but any other application program may be used so long as it is an application program to which the add-in module or the like can be added. That is, the invention can be also applied to application control of the module in the installer and application program for adding one or a plurality of add-in modules (filter modules) to one or a plurality of application programs installed into the computer.

In the embodiment, the construction and contents of the foregoing various kinds of data are not limited to those mentioned above but, naturally, they are constructed by various constructions and contents according to the application and object.

Although one embodiment has been shown above, the invention can have an embodiment as, for example, a system, an apparatus, a method, a program, a storing medium, or the like. Specifically speaking, the invention may be applied to a system constructed by a plurality of apparatuses or to an apparatus constructed by one device.

A construction of a memory map in a storing medium which stores various data processing programs which can be read by the information processing apparatus (computer 100) according to the invention will be described hereinbelow with reference to the memory map illustrated in FIG. 22.

FIG. 22 is a diagram for describing the memory map in a storing medium (recording medium) for storing various data processing programs which can be read by the information processing apparatus (computer 100) according to the invention.

Although not shown in particular, there is also a case where information for managing a group of programs which are stored into the storing medium, for example, version information, implementors, and the like are also stored and information depending on the OS or the like on the program reading side, for example, icons or the like which identify and display the programs are also stored.

Further, data which depends on the various kinds of programs is also managed in the directory. There is also a case where a program for installing various programs into the computer and, if the program for installing has been compressed, a program for decoding such a program, and the like are stored.

The functions shown in FIGS. 4, 5, 6, 7, 8, 14, 17, 18, 19, 20, and 21 in the embodiments may be executed by a host computer according to a program which is installed from the outside. In such a case, the invention is also applied to a case where an information group including the program is supplied to an output apparatus by a storing medium such as CD-ROM, flash memory, or FD or from an external storing medium through the network.

Naturally, the object of the invention is accomplished by a method whereby a storing medium in which program codes of software for realizing the functions of the foregoing embodiments have been recorded as mentioned above is supplied to a system or an apparatus and a computer (or a CPU or an MPU) of the system or apparatus reads out and executes the program codes stored in the storing medium.

In this case, the program codes themselves read out of the storing medium realize the novel functions of the invention and the storing medium in which the program codes have been stored constructs the invention.

Therefore, it is possible to use any one of an object code, a program which is executed by an interpreter, script data which is supplied to the OS, and the like so long as it has the function of the program, and the format of the program is not limited.

As a storing medium for supplying the program, for example, a flexible disk, a hard disk, an optical disc, a magnetooptic disk, an MO, a CD-ROM, CD-R, CD-RW, a magnetic tape, a non-volatile memory card, a ROM, a DVD, or the like can be used.

In this case, the program codes themselves read out of the storing medium realize the functions of the embodiments mentioned above and the storing medium in which the program codes have been stored constructs the invention.

As another program supplying method, the program can be also supplied by a method whereby a client computer is connected to a Home page of the Internet by using a browser of the client computer and the program itself of the invention is downloaded from the Home page into a storing medium such as a hard disk. The program can be also supplied by a method whereby a compressed file including an automatic installing function is downloaded from the Home page onto the storing medium such as a hard disk. The program supplying method can be also realized by a method whereby the program codes constructing the program of the invention are divided into a plurality of files and the respective files are downloaded from different Home pages. That is, a WWW server, an FTP server, or the like for allowing a program file to realize the functional processes of the invention by the computer to be downloaded to a plurality of users is also incorporated in the scope of claims of the invention.

The program of the invention is encrypted, stored into the storing medium such as a CD-ROM, and distributed to the user. Further, the users who can satisfy predetermined conditions are allowed to download key information for decrypting the encryption from the Home page through the Internet. Moreover, the encrypted program is executed by using the key information and installed into the computer and can be realized.

Naturally, the invention incorporates not only a construction in which the computer executes the read-out program codes, so that the functions of the foregoing embodiments are realized, but also the following construction. For example, the OS (operating system) or the like which is operating on the computer executes a part or all of actual processes based on the instructions of the program codes and the functions of the foregoing embodiments are realized by those processes.

Further, naturally, the invention incorporates a case where the program codes read out of the storing medium are written into a memory provided for a function expanding board inserted into the computer or a function expanding unit connected to the computer, a CPU or the like provided for the function expanding board or the function expanding unit executes a part or all of actual processes based on the instructions of the program codes written in the memory and the functions of the foregoing embodiments are realized by those processes.

The invention can be applied to a system constructed by a plurality of apparatuses or may be applied to an apparatus constructed by one device. Naturally, the invention can be also applied to the case where the object of the invention is accomplished by supplying the program to the system or apparatus. In this case, the storing medium in which the program expressed by the software for accomplishing the present invention has been stored is supplied to the system or apparatus and read out, so that the system or apparatus can obtain the effects of the invention.

The invention is not limited to the foregoing embodiments but various modifications (including an organic combination of the embodiments) are possible based on the essence of the present invention and they are not excluded from the scope of the invention.

Although the invention has been described above while showing various embodiments, it will be understood to those skilled in the art that the essence and scope of the invention are not limited to the specific description in the specification.

All constructions obtained by combining the foregoing embodiments and their modifications are also incorporated in the present invention.

As described above, the invention relates to the installer which can add the module to the printer driver installed in the information processing apparatus. When the module is added, the modules which have been installed at present are detected, and the module is installed in consideration of the operating order of the module to be added and the installed modules. Therefore, when the module is added to the printer driver, the setting control can be made so that the operating order of the module to be added and the existing modules constructing the printer driver is made correct.

The invention also incorporates the printer driver for making the modules installed in the proper order (order adapted to make the modules operative) operative based on the installing method when executing the printing. Therefore, upon execution of the printing process, the printer driver can properly apply the modules constructing the printer driver and make them operative.

As mentioned above, by providing the novel functions by the add-in module or the filter module, it is possible to construct the flexible new-function providing environment of the printer driver which can add, in the correct operating order, the function which is not presumed at the beginning of the sale of the printing apparatus or the function which the user wants to optionally add.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-100194, filed Mar. 31, 2006, which is hereby incorporated by reference herein in its entirety.

The invention claimed is:

1. A setup method of an information processing apparatus in which a module as a control program for expanding a printer driver has been installed and a set-up is executed in response to an installing instruction for the printer driver, comprising the steps of:
   receiving an instruction indicative of adding a new module;
   detecting the module installed in the information processing apparatus, in response to the received instruction; and
   setting up the information processing apparatus such that the new module and the detected module execute processes in an operating order,
   wherein, in said setting-up step, if the operating order related to the new module and the detected module is not determined, a warning is issued and an installing process of the new module is stopped.

2. A method according to claim 1, wherein, in said setting-up step, registration of modules into construction information of the printer driver is changed to reflect that the new module and the detected module execute the processes in the operating order.

3. A method according to claim 2, wherein the printer driver sequentially calls the modules in the information processing apparatus in the operating order based on the construction information of the printer driver.

4. A method according to claim 1, further comprising the step of displaying a message showing whether or not the set-up has been completed in the operating order.

5. A method according to claim 1, wherein, when an encryption module and an alteration detection module are included in a plurality of modules including the new module and the detected module, the information processing apparatus is set up such that, as the operating order, a process by the alteration detection module is executed after a process by the encryption module.

6. An information processing apparatus in which a module as a control program for expanding a printer driver has been installed and a set-up is executed in response to an installing instruction for the printer driver, comprising:
   a receiving unit which receives an instruction indicative of adding a new module;
   a detecting unit adapted to detect the module installed in the information processing apparatus in response to the received instruction; and
   a set-up unit adapted to set up the information processing apparatus such that the new module and the detected module execute processes in an operating order,
   wherein said set-up unit, if the operating order related to the new module and the detected module is not determined, issues a warning and stops an installing process of the new module.

7. An apparatus according to claim 6, wherein said set-up unit changes registration of modules into construction information of the printer driver to reflect that the new module and the detected module execute the processes in the operating order.

8. An apparatus according to claim 7, further comprising a control unit adapted to call the modules in the information processing apparatus in the operating order based on the construction information of the printer driver.

9. An apparatus according to claim 6, further comprising a display unit adapted to display a message showing whether or not the set-up has been completed in the operating order.

10. An apparatus according to claim 6, wherein, when an encryption module and an alteration detection module are included in a plurality of modules including the new module and the detected module, said set-up unit sets up the information processing apparatus such that, as the operating order, a process by the alteration detection module is executed after a process by the encryption module.

11. A non-transitory computer-readable storage medium storing a computer program for causing a computer to execute a method of setting up an information processing apparatus in which and a module as a control program for expanding a printer driver has been installed and a set-up is executed in response to an installing instruction for the printer driver, the method comprising the steps of:

receiving an instruction indicative of adding a new module;
detecting the module installed in the information processing apparatus, in response to the received instruction; and
setting up the information processing apparatus such that the new module and the detected module execute processes in an operating order,
wherein, in said setting-up step, if the operating order related to the new module and the detected module is not determined, a warning is issued and an installing process of the new module is stopped.

12. A set-up method of an information processing apparatus in which a module has been installed which serves as a control program for expanding a printer driver and a set-up is executed in response to an installing instruction for the printer driver, the method comprising the steps of:

detecting a plurality of modules to be installed in the information processing apparatus as add-in modules to the printer driver for expanding the function of the printer driver; and
setting up the information processing apparatus by determining priorities of the plurality of modules in response to the detection in said detecting step and by installing the plurality of modules, such that the plurality of modules execute respective processes in a sequential order based on the determined priorities.

13. An information processing apparatus in which a module has been installed which serves as a control program for expanding a printer driver and a set-up is executed in response to an installing instruction for the printer driver, comprising:

a detecting unit which detects a plurality of modules to be installed in the information processing apparatus as add-in modules to the printer driver for expanding the function of the printer driver; and
a set-up unit which sets up the information processing apparatus by determining priorities of the plurality of modules in response to the detection by said detecting unit and by installing the plurality of modules, such that the plurality of modules execute respective processes in a sequential order based on the determined priorities.

14. A non-transitory computer-readable storage medium storing, in executable form, a program for causing an information processing apparatus to execute a method, the method comprising the steps of:

detecting a plurality of modules to be installed in the information processing apparatus as add-in modules to the printer driver for expanding the function of the printer driver; and
setting up the information processing apparatus by determining priorities of the plurality of modules in response to the detection in said detecting step and by installing the plurality of modules, such that the plurality of modules execute respective processes in a sequential order based on the determined priorities.

15. A set-up method of an information processing apparatus in which a module as a control program for expanding a printer driver has been installed and a set-up is executed in response to an installing instruction for the printer driver, comprising the steps of:

receiving an instruction indicative of adding a new module;
detecting the module installed in the information processing apparatus, in response to the received instruction; and
setting up the information processing apparatus such that the new module and the detected module execute processes in an operating order,
wherein, when an encryption module and an alteration detection module are included in a plurality of modules including the new module and the detected module, the information processing apparatus is set up such that, as the operating order, a process by the alteration detection module is executed after a process by the encryption module.

16. An information processing apparatus in which a module as a control program for expanding a printer driver has been installed and a set-up is executed in response to an installing instruction for the printer driver, comprising:

a receiving unit which receives an instruction indicative of adding a new module;
a detecting unit which detects the module installed in the information processing apparatus, in response to the received instruction; and
a setting unit which sets up the information processing apparatus such that the new module and the detected module execute processes in an operating order,
wherein, when an encryption module and an alteration detection module are included in a plurality of modules including the new module and the detected module, said setting unit sets up the information processing apparatus such that, as the operating order, a process by the alteration detection module is executed after a process by the encryption module.

17. A non-transitory computer-readable storage medium storing an executable program for causing a computer to execute a method of an information processing apparatus in which a module as a control program for expanding a printer driver has been installed and a set-up is executed in response to an installing instruction for the printer driver, the method comprising the steps of:

receiving an instruction indicative of adding a new module;
detecting the module installed in the information processing apparatus, in response to the received instruction; and
setting up the information processing apparatus such that the new module and the detected module execute processes in an operating order,
wherein, when an encryption module and an alteration detection module are included in a plurality of modules including the new module and the detected module, the information processing apparatus is set up such that, as the operating order, a process by the alteration detection module is executed after a process by the encryption module.

* * * * *